US005857000A

United States Patent [19]

Jar-Ferr et al.

[11] Patent Number: 5,857,000

[45] Date of Patent: Jan. 5, 1999

[54] TIME DOMAIN ALIASING CANCELLATION APPARATUS AND SIGNAL PROCESSING METHOD THEREOF

[75] Inventors: Yang Jar-Ferr; Chan Din-Yuen, both of Tainan, Taiwan

[73] Assignee: National Science Council, Taipei, Taiwan

[21] Appl. No.: 759,672

[22] Filed: Dec. 6, 1996

[30] Foreign Application Priority Data

Sep. 7, 1996 [TW] Taiwan ................................ 85110945

[51] Int. Cl.[6] ................................ H04B 1/66; G10L 3/02

[52] U.S. Cl. ...................... 375/240; 704/203; 364/400.01

[58] Field of Search ............................ 375/240; 370/477; 704/203, 204, 500; 364/725.03, 400.01; 348/395, 403; 382/250

[56] References Cited

U.S. PATENT DOCUMENTS

| | | | |
|---|---|---|---|
| 5,109,417 | 4/1992 | Fielder et al. | 704/205 |
| 5,297,236 | 3/1994 | Antill et al. | 704/203 |
| 5,363,096 | 11/1994 | Duhamel et al. | 341/50 |
| 5,640,421 | 6/1997 | Sonohara et al. | 375/240 |

FOREIGN PATENT DOCUMENTS

| | | |
|---|---|---|
| WO 90/09022 | 9/1990 | WIPO . |
| WO 92/22137 | 10/1992 | WIPO . |

OTHER PUBLICATIONS

Princen, J.P. and Bradley, A.B., "Analysis/Synthesis Filter Bank Design Based on Time Domain Aliasing Cancellation," IEEE Trans. on Acoustics, Speech and Signal Processing, vol. ASSP–34, No. 5, pp. 1153–1161, Oct. 1986.

Duhamel, P., Mahieux, Y. and Petit, J.P., "A Fast Algorithm for the Implementation of Filter Banks Based on 'Time Domain Aliasing Cancellation'," IEEE Int'l Conf. on Acoustics, Speech and Signal Processing, pp. 2209–2212, May 1991.

*Primary Examiner*—Stephen Chin
*Assistant Examiner*—Jeffrey W. Gluck
*Attorney, Agent, or Firm*—Sughrue, Mion, Zinn, Macpeak & Seas, PLLC

[57] ABSTRACT

A time domain aliasing cancellation (TDAC) apparatus and its signal processing method to be used with the AC-3 high-fidelity audio signal compression system of the MPEG-2 international video standard. This invention proposes two preferred embodiments to realize the compression encoding and decoding processes of the TDAC apparatus. The first preferred embodiment employs a data reordering technique to change the TDAC encoding to a discrete cosine transform (DCT), and furthermore, it changes the TDAC decoding to a inverse discrete cosine transform (IDCT). This implementation has the least computational complexity. The second preferred embodiment utilizes data reordering to change the TDAC encoding and decoding into a type IV discrete cosine transformation, and then converts the DCT transformation into a 2nd order infinite impulse filter. The multiplication coefficients in this filter can be fixed to improve the precision and also to reduce the amount of computations. This implementation of the TDAC apparatus has the simplest hardware structure. Both preferred embodiments are suitable for implementation using VLSI technology.

9 Claims, 7 Drawing Sheets

TIME DOMAIN ALIASING CANCELLATION APPARATUS AND SIGNAL PROCESSING METHOD THEREOF

BACKGROUND OF THE INVENTION

1. Technical Field of the Invention

The invention relates in general to a data encoding and decoding apparatus and the corresponding data processing method thereof for processing multi-channel audio signal. The MPEG-2 international video and audio standard has adopted the AC-3 high-fidelity multi-channel audio signal compression technique developed by the DOLBY Inc., in which the subband coding analysis and synthesis filters utilize time-domain aliasing cancellation technique. The invention provides a highly-efficient and compact technique for implementing the encoding and decoding process of the time-domain aliasing cancellation apparatus.

2. Background Art of the Invention

Due to increased demands for high-quality audio and video entertainment for private uses, multi-channel high-fidelity audio equipments are gradually moving from the public entertainment facilities, like the movie theaters, into the living room for many families. To achieve wide-spread private uses, the cost of these equipments must be lowered substantially. The compression apparatus of these multi-channel high-fidelity audio equipments is the key element of the cost reduction efforts. Manufacturing cost of these equipments can be significantly reduced simply by developing simple and highly efficient signal processing technique to be implemented in semiconductor devices.

Currently, the most widely adopted high-end audio signal compression technique is the AC-3 multi-channel high-fidelity audio signal compression technique invented by DOLBY Inc. Because its subband encoding filter using the time-domain aliasing cancellation (TDAC) technique requires a large amount of computations, the TDAC apparatus becomes the key technology for audio compression. The TDAC analysis and synthesis filters are also treated as the modified discrete cosine transform and the inverse modified discrete cosine transform. Dolby Inc. employs Fast Fourier Transform (FFT) to achieve the TDAC operation. The details of this technique can be found in the documentation Dolby AC-3, Multi-Channel Digital Audio Compression System Algorithm Description, Dolby Laboratories Information, Feb. 22, 1994 Revision 1.12, Dolby Laboratories Inc. Also, according to Duhamel's suggestion (P. Duhamel, "Implementation of 'Split-Radix' FFT Algorithm for Complex, Real, and Real-Symmetric Data," IEEE Trans. on Acoustics, Speech and Signal Processing, Vol. ASSP-34, No. 2, pp. 285–295, April 1986), the FFT can be substituted by split-radix FFT (SRFFT) to speed up the compression and de-compression operations. Nevertheless, the SRFFT still requires tremendous amount of computations. Thus, any manufacturer possessing a simple and fast technique for TDAC will have an advantage the highly competitive international market.

SUMMARY OF THE INVENTION

Therefore, it is an object of this invention to provide a new apparatus to increase the speed of the TDAC calculation.

It is another object of the invention is to provide a new TDAC apparatus which decreases the cost of TDAC hardware.

To achieve the above identified objects, the invention provides a TDAC apparatus with minimal computational requirement. This TDAC apparatus includes: an encoding device to transform an m-th time-domain signal frame $x_m(n)$ into an m-th signal frame $X_m(k)$ in the frequency domain; and a decoding device to transform the input frequency-domain signal frame $X_m(k)$ back to a time-domain signal frame $x'_m(n)$. The time-domain signal frames $x_m(n)$ and $x'_m(n)$ and frequency-domain signal frame $X_m(k)$ have N terms, N is a positive integer number of power of 2, and n, k, and m are integers.

The encoding device of the TDAC apparatus includes a modified analysis window function unit, an encoding unit, a subtraction unit, a DCT unit, an adder and an output unit.

The modified analysis window function unit multiplies each term of the input time-domain signal frame $x_m(n)$ with a modified analysis window function $w_E(n)$, to generate a first time sequence s(n), i.e., $$s(n)=x_m(n)w_E(n)$$

wherein $$w_E(n)=\frac{h(N-1-n)}{2\cos\left\{\frac{(2n+1)\pi}{2N}+\frac{\pi}{4}\right\}}\ \text{when } 0\leqq n\leqq\left(\frac{N}{4}-1\right);$$

$$w_E(n)=\frac{h(N-1-n)}{2\cos\left\{\frac{(2n+1)\pi}{2N}-\frac{3\pi}{4}\right\}}\ \text{when } \frac{N}{4}\leqq n\leqq\left(\frac{N}{2}-1\right);$$

$$w_E(n)=\frac{h(N-1-n)}{2\cos\left\{\frac{(2n+1)\pi}{2N}-\frac{3\pi}{4}\right\}}\ \text{when } \frac{N}{2}\leqq n\leqq\left(\frac{3N}{4}-1\right);$$

$$w_E(n)=\frac{h(N-1-n)}{2\cos\left\{\frac{(2n+1)\pi}{2N}+\frac{\pi}{4}\right\}}\ \text{when } \frac{3N}{4}\leqq n\leqq(N-1),$$

where h(n) is the original analysis window function of a coding system.

The encoding unit reorganizes the first time sequence s (n) to generate a second time sequence y(n) with length N. The first N/4 terms of the second time sequence y(n) are composed of the last N/4 terms of the first time sequence s(n), while the last 3N/4 terms of y(n) are composed of the first 3N/4 terms of s(n).

The subtraction unit subtracts the first N/2 terms of the second time sequence y(n) by the second half terms of the time sequence in reverse order to generate a third time sequence u(n), i.e., u(n)=y(n)−y(N−1−n).

The DCT unit is used to perform a discrete cosine transformation on the third time sequence u(n) to generate a first frequency-domain sequence U(k), where k is the frequency index. The DCT transformation equation is:

$$U(k)=\sum_{n=0}^{\frac{N}{2}-1}u(n)\cos\frac{(2n+1)k\pi}{N}.$$

The adder utilizes the first frequency sequence U(k) to generate a second frequency sequence Y(k) with length N/2 according to Y(k)=U(k+1)+U(k).

The output unit uses the second frequency sequence U(k) to generate an output encoded frequency sequence $X_m(k)$ with length N. The first N/2 terms of $X_m(k)$ are Y(k) multiplied by a phase factor $(-1)^{mk}$, i.e., $X_m(k)=(-1)^{mk}Y(k)$. The last N/2 terms of $X_m(k)$ are Y(k) in reversed order and multiplied by a phase factor $(-1)^{mk+1}$, i.e., $X_m(k)=(-1)^{mk+1}Y(N-k-1)$ In addition, The decoding device of the TDAC apparatus includes an input sign change unit, a shift-and-add unit, a DCT unit, a decoding unit and a modified synthesis window function unit.

The input sign change unit multiplies a phase factor $(-1)^{mk}$ to the frequency sequence $X_m(k)$ to generate a third frequency sequence Y(k), i.e., $Y(k)=(-1)^{mk}X_m(k)$.

a shift-and-add unit utilizes the third frequency sequence Y(k) to generate a fourth frequency sequence Z(k) with length N/2. When k is between 1 to N/2−1, Z(k)=2Y(k−1) +2Y(k). When k is equal to zero, Z(k)=2Y(0). The multiplication of 2 can be achieved by shift Y(k) to the left by 1 bit.

The IDCT unit performs an inverse discrete cosine transformation on the fourth frequency sequence Z(k) to generate a fourth time sequence z(n) with length N/2, in which the IDCT transformation equation is:

$$z(n) = \sum_{k=0}^{\frac{N}{2}-1} Z(k)\cos\frac{(2n+1)k\pi}{N}.$$

The decoding unit rearranges the fourth time sequence z(n) to generate a fifth time sequence $q_m(n)$, in which the first N/4 terms of $q_m(n)$ are composed of the second half of z(n), the second N/4 terms of $q_m(n)$ are composed of the second half of z(n) in reversed order, the third N/4 terms of $q_m(n)$ are the first half of z(n) in reversed order, and the last N/4 terms of $q_m(n)$ are the first half of the fourth time sequence z(n).

The modified synthesis window function unit then multiplies the fifth time sequences $q_m(n)$ and $q_{m-1}(n)$in the current and previous frames by a modified synthesis window function $W_D(n)$ to generate the desired output time sequence $x'_m(n)$, i.e., $$x_m'(n) = w_D\left(n+\frac{N}{2}\right)q_{m-1}\left(n+\frac{N}{2}\right) + w_D(n)q_m(n),$$

wherein $$w_D(n) = \frac{f(n)}{2N\cos\left\{\frac{(2n+1)\pi}{2N}+\frac{\pi}{4}\right\}} \text{ when } 0 \leqq n \leqq \left(\frac{N}{4}-1\right);$$

$$w_D(n) = \frac{f(n)}{2N\cos\left\{\frac{(2n+1)\pi}{2N}-\frac{3\pi}{4}\right\}} \text{ when } \frac{N}{4} \leqq n \leqq \left(\frac{N}{2}-1\right);$$

$$w_D(n) = \frac{f(n)}{2N\cos\left\{\frac{(2n+1)\pi}{2N}-\frac{3\pi}{4}\right\}} \text{ when } \frac{N}{2} \leqq n \leqq \left(\frac{3N}{4}-1\right);$$

and $$w_D(n) = \frac{f(n)}{2N\cos\left\{\frac{(2n+1)\pi}{2N}+\frac{\pi}{4}\right\}} \text{ when } \frac{3N}{4} \leqq n \leqq (N-1),$$

in which f(n) is the original synthesis window function of a coding system.

The present invention also provides a simple TDAC apparatus with the least design complexities. This TDAC apparatus includes an encoding device transforming the m-th frame sequence $x_m(n)$ in the time-domain into the m-th signal frame $X_m(k)$ in the frequency domain, and a decoding device transforming the frequency-domain sequence $X_m(k)$ back to a time-domain sequence $x'_m(n)$. The time-domain sequence $x_m(n)$ and $x'_m(n)$ and the frequency-domain sequence $X_m(k)$ have N terms, in which N is a positive integer number of power of 2, and n, k, and m are integers.

The TDAC encoding device includes a modified analysis window function unit, an encoding unit, a subtraction unit, a first buffer, a first address unit, a first sign change unit, a first digital filter unit and an output unit.

The modified analysis window function unit multiplies each term of the input time sequence $x_m(n)$ by a modified analysis window function $W_D(n)$ in reversed order to generate a first time sequence s(n) with length N, i.e., $s(n)=x_m(n)w_E(N-1-n)$ wherein $$w_E(n) = (-1)^J h(n)\sin\frac{(2J+1)\pi}{2N},$$

where J is a fixed and selectable integer and h(n) is the original analysis window function of a coding system.

The encoding unit reorganizes the first time sequence s(n) to generate a second time sequence y(n) with length N. The first N/4 terms of the second time sequence y(n) are composed of the negative of the last N/4 terms of the first time sequence s(n), and the last 3N/4 terms of y(n) are composed of the first 3N/4 terms of s(n);

The subtraction unit subtracts the first N/2 terms of the second time sequence y(n) by the second half terms of the time sequence in reverse order to generate a third time sequence v(n).

The first buffer has N/2 random access registers for storing the third time sequence v(n).

The first address unit utilizes a first parameter as the address to select individual terms of the third time sequence v(n) from the first buffer register, and rearranges them to compose a fourth time sequence v'(n).

The first sign change unit uses a second parameter to correct the sign of the terms in the fourth time sequence v'(n).

The first digital filter unit converts the fourth time sequence v'(n) into an encoded frequency sequence Y(k), in which k an integer. The frequency sequence Y(k) is the type-IV discrete cosine transform of v'(n).

The output unit generates an output encoded frequency sequence $X_m(k)$ with length N from the first frequency sequence Y(k). The first N/2 terms of $X_m(k)$ are the terms in Y(k) multiplied by a sign-change factor $(-1)^{mk}$, i.e., $X_m(k)=(-1)^{mk}Y(k)$. The second N/2 terms of $X_m(k)$ are the terms in Y(k) with reversed order and multiplied by a sign-change factor $(-1)^{mk+1}$, i.e., $X_m(k)=(-1)^{mk+1}Y(N-k-1)$.

In addition, The decoding device of the second preferred embodiment includes an input sign change unit, a second buffer, a second address unit, a sign change unit, a second digital filter, a decoding unit and a modified synthesis window function unit.

The input sign change unit adds a phase factor of $(-1)^{mk}$ to the frequency sequence $X_m(k)$ to generate a frequency sequence Y(k), i.e., $Y(k)=(-1)^{mk}X_m(k)$, and then shifts Y(k) by one bit to the left to perform a multiplication by 2, i.e., 2Y(k).

The second buffer has N/2 random access memory (RAM) registers for storing the second frequency sequence 2Y(k).

The second address unit utilizes a first parameter as the address to select individual terms of the second frequency sequence 2Y(k) from the buffer register, and rearranges them to compose a third frequency sequence Y'(k).

The sign change unit uses a second parameter to adjust the sign of the third frequency sequence Y'(k).

The second digital filter unit converts the terms of the third frequency sequence Y'(k) into a seventh time sequence z(n). The fifth time sequence y(n) is the discrete cosine transformation of the third frequency sequence Y'(k).

The decoding unit rearranges the fifth time sequence y(n) to generate a sixth time sequence $q_m(n)$ with N terms. Its first 3N/4 terms are composed of the last 3N/4 terms of the fifth time sequence y(n), and its last N/4 terms are the negative of the first N/4 terms of y(n).

The modified synthesis window function unit multiplies the sixth time sequence $q_m(n)$ and $q_{m-1}(n)$ with a modified synthesis window function $W_D(n)$, and to combine them to form a final time sequence $x'_m$ wherein $$x'_m(n) = w_D\left(n + \frac{N}{2}\right)q_{m-1}\left(n + \frac{N}{2}\right) + w_D(n)q_m(n), \text{ and}$$

$$w_D(n) = (-1)^J f(n)\sin\frac{(2J+1)\pi}{2N}.$$

where J is a selectable integer and h(n) is the original synthesis window function of a coding system.

The filtering procedure of the encoding and decoding devices are as follows: an input signal and a internal signal were added to generate a first internal signal; the first internal signal is then delayed to generate a second internal signal; the second internal signal is delayed again to generate a third internal signal; the second internal signal is multiplied by a constant coefficient to generate a fourth internal signal; the third and fourth internal signals are then added together to form a fifth internal signal; also, the first and second internal signals are added to generate the output signal.

The procedure to generate the first parameter is as follows: let the first parameter be $\tilde{n}$, then $\tilde{n}$ must satisfies the condition $$(2k+1)\,\tilde{n}|_{mod\ N} = (2J+1)n + J - k|_{mod\ N}$$

in which J is frequency index of the constant multiplicand of the first parameter. A left accumulator and a right accumulator are used to store the value of the left-hand-side and the value of the right-hand-side of the above equation, respectively. If value of n is fixed in the right accumulator, value of the right accumulator maintained to be a positive number, and increase $\tilde{n}$ from 0 until the value of the left accumulator and the right accumulator are equal, then the value of $\tilde{n}$ is an intermediate solution of the first parameter. If $\tilde{n}$ is less than N/2−1, then the solution of the first parameter is $\tilde{n}$. On the other hand, if $\tilde{n}$ is greater than N/2−1, then the solution of the first parameter is $N-1-\tilde{n}$. The procedure to generate the second parameter is: using a left counter and a right counter to record the carry-over of the left and right accumulators, respectively. If the intermediate solution $\tilde{n}$ is less than or equal to N/2−1, the value of the second parameter is the result of the XOR of the value of the left and right counters. If the intermediate solution is greater than N/2−1, then the value of the second parameter is the result of the $\overline{XOR}$ of the values of the left and right counters.

Figure 4:
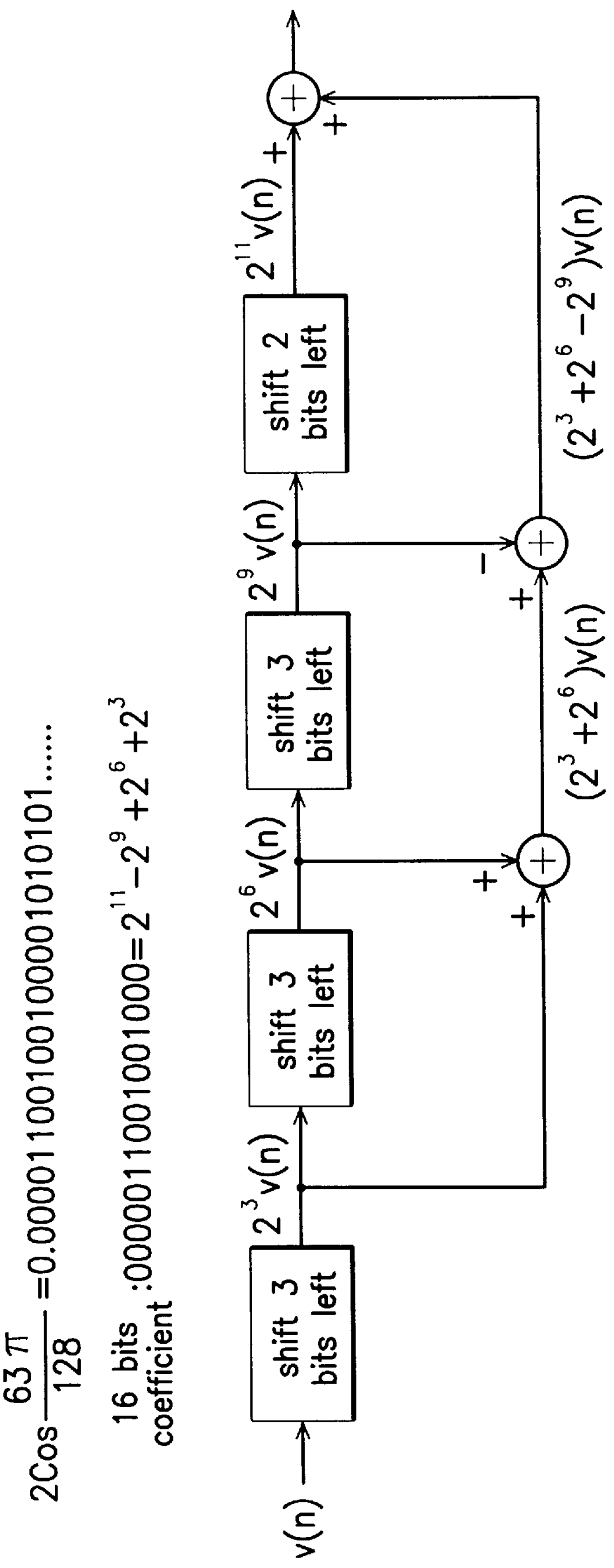
Figure 5:
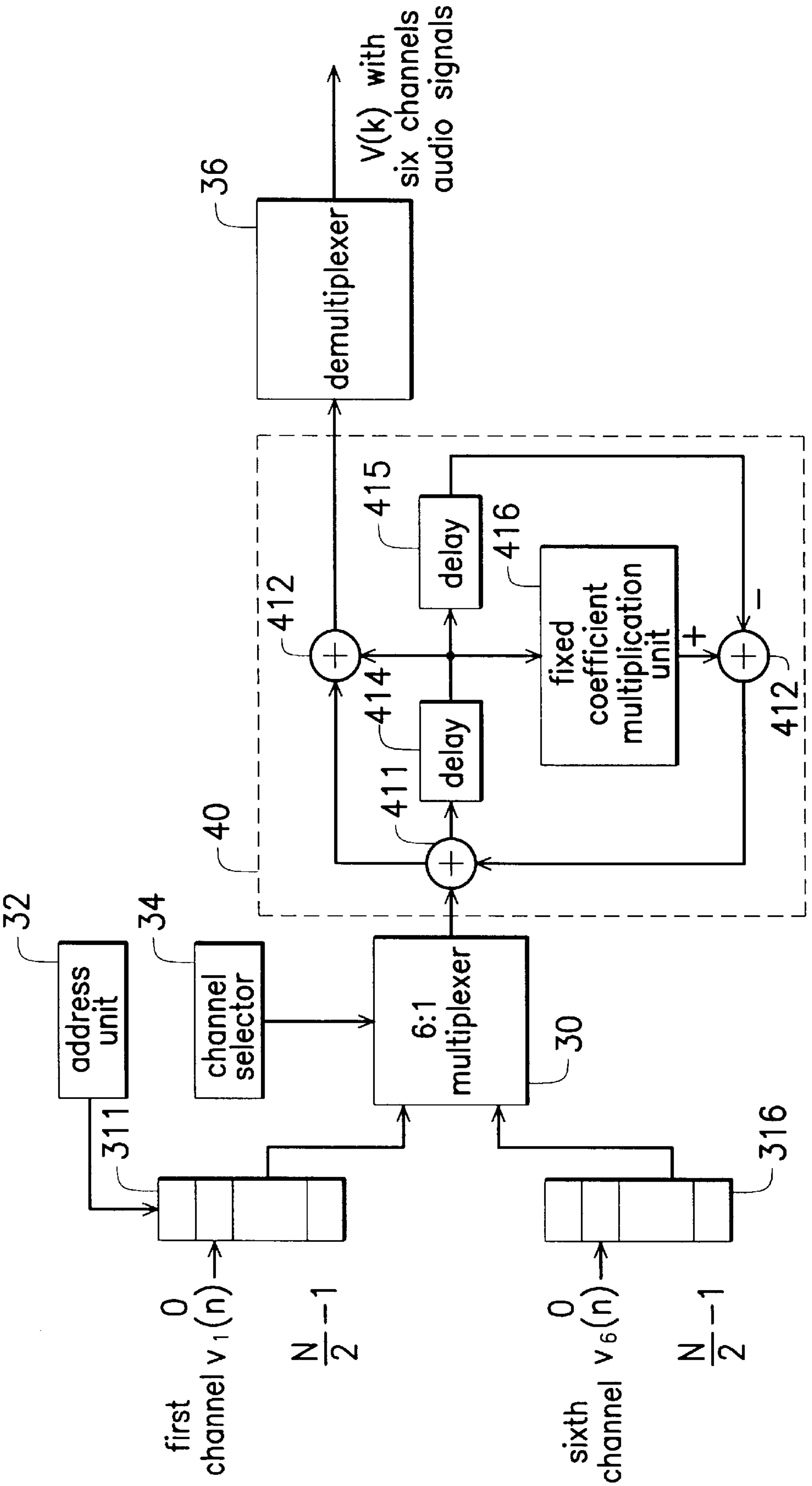
Figure 6:
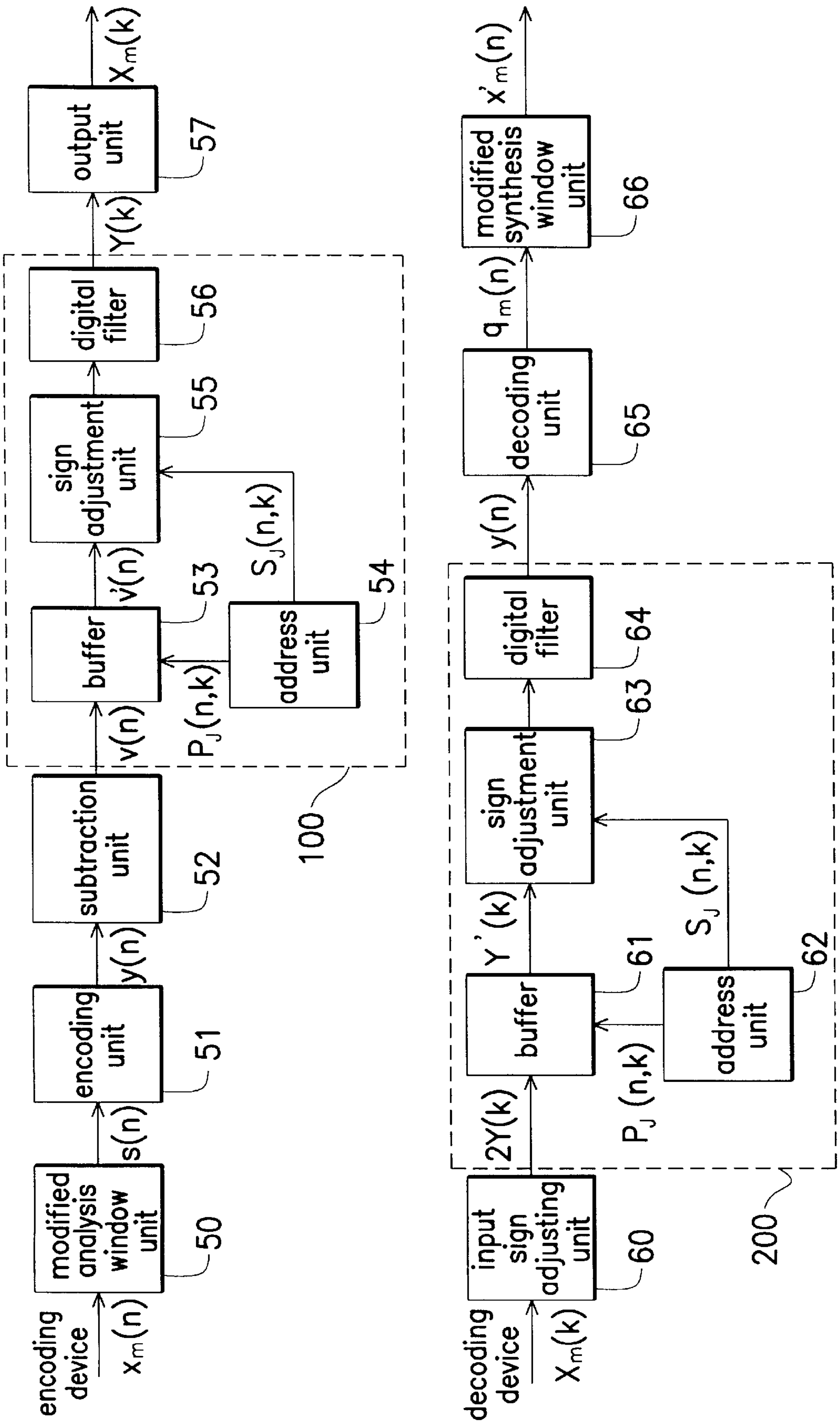
Figure 7:
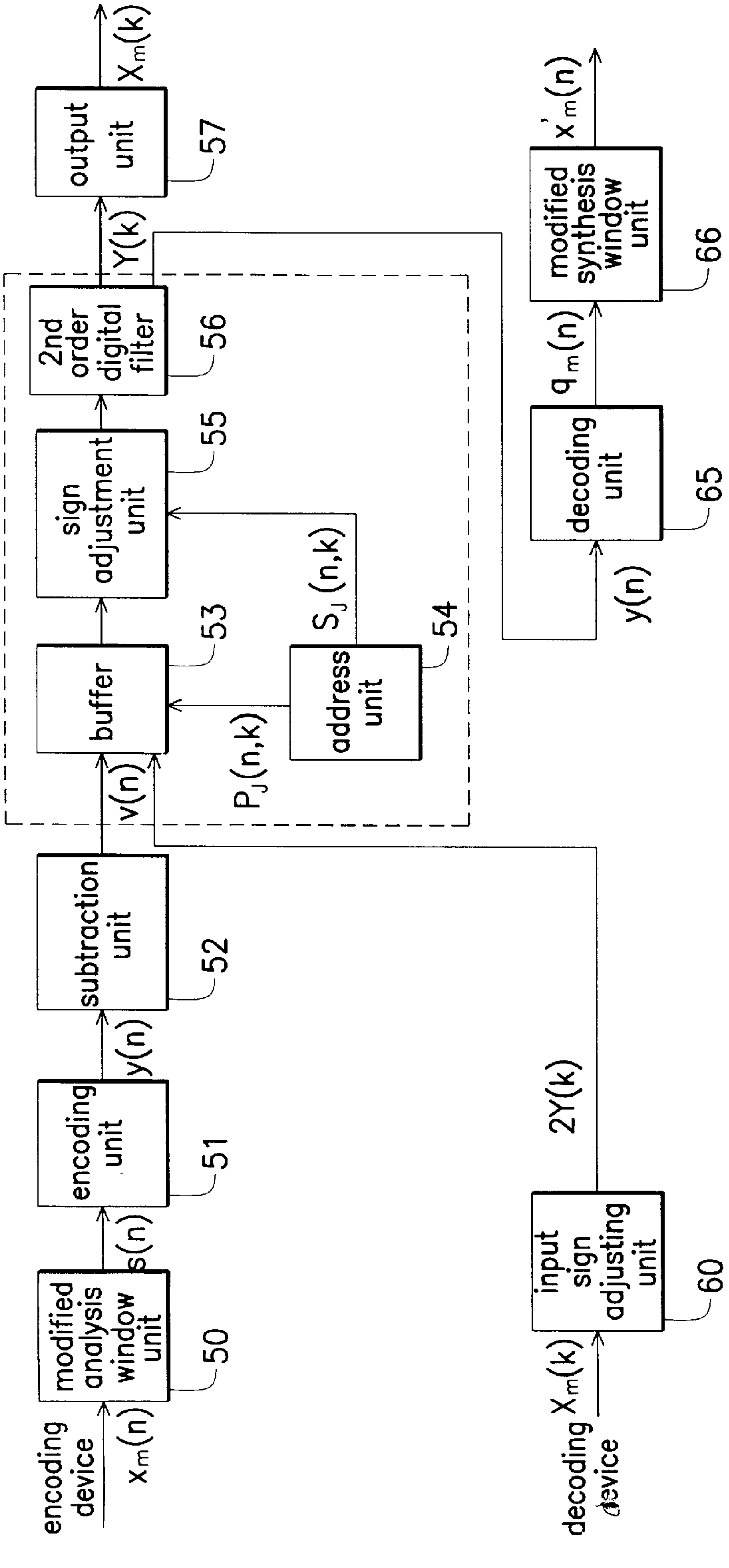

with N=128;

FIG. 4 shows the block diagram of the 16 valid digits when performing the multiplication of $$2\cos\frac{63\pi}{128}$$

with N=128;

FIG. 5 is the block diagram of the second preferred embodiment used for processing a 6-channel audio signals;

FIG. 6 is the system block diagram of the TDAC apparatus in accordance with the second preferred embodiment of the invention; and FIG. 7 is the system block diagram of a TDAC apparatus that simultaneously provides the encoding and decoding function according to the second preferred embodiment of the invention.

DETAILED DESCRIPTIONS OF THE PREFERRED EMBODIMENT

Embodiment 1

As was discussed in the previous section, Fast Fourier Transform (FFT) was commonly used in the time-domain aliasing cancellation method. This preferred embodiment utilizes data reordering, and employs Discrete Cosine Transform (DCT) during the TDAC encoding process and employs Inverse Discrete Cosine Transform (IDCT) during the TDAC decoding process. Since both DCT and IDCT are well-known and well-developed transformation techniques, it is possible to manufacture a TDAC semiconductor IC with relatively lower cost which is also simpler in design and with less computational complexity. The following descriptions illustrate the apparatus and the working principle of this preferred embodiment.

The principle of the TDAC can be considered separately at the encoding and decoding process. In J. P. Princen, A. W. Johnson and A. B. Bradley, "Subband/Transform Coding Using Filter Band Designs Based on Time-Domain Aliasing Cancellation," in Proc. ICASSP 87, pp. 2161–2164, 1987, the TDAC encoding of the m-th signal of an input sequence $x_m(n)$ can be accomplished by the following expression:

$$X_m(k) = \cos(\pi mk)\sum_{n=0}^{N-1} x_m(n)h(N-1-n)\cos\frac{2\pi\left(k+\frac{1}{2}\right)\left(n+\frac{1}{2}+\frac{N}{4}\right)}{N} \quad (1)$$

in which N is a positive integer of power of 2, denoting the number of terms of the input sequence $x_m(n)$; and n and k are integers with value between 0 and N−1. The h(n) function denotes the original analysis window function, corresponding to the synthesis window function f(n) used in the decoding device. The aliasing in the time domain will be canceled when suitable constraints are applied between these two functions. On the other hand, the output frequency sequence $X_m(k)$ of the encoding device can be digitized based on its amplitude. If the error can be ignored, the synthesis window function f(n) and the TDAC decoding can be used to retrieve the time sequence $x'_m(n)$, i.e., $$q_m(n) = \frac{1}{N}\sum_{k=0}^{N-1}\cos(\pi mk)X_m(k)\cos\frac{2\pi\left(k+\frac{1}{2}\right)\left(n+\frac{1}{2}+\frac{N}{4}\right)}{N} \quad (2)$$

and $$x'_m(n) = f\left(n+\frac{N}{2}\right)q_{m-1}\left(n+\frac{N}{2}\right)+f(n)q_m(n). \quad (3)$$

Here, $q_{m-1}(n)$ is the time sequence obtained from eq. (2) with the preceding input frequency signal frame $X_{m-1}(k)$.

This preferred embodiment employs DCT to carry out the transformation in eq. (1), and IDCT to perform the transformation in eq. (2) and (3). First, the transformation in eq. (1) is simplified. Let $$s(n) = x_m(n)h(N-1-n),\ \text{when } n = 0,1,\ldots,N-1; \quad (4)$$

$$Y(k) = \frac{X_m(k)}{\cos(\pi mk)} = (-1)^{mk}X_m(k)\ \text{when } k = 0,1,\ldots,N-1; \quad (5)$$

Eq. (4) is known as analysis windowing. Eq. (5) shows the relationship between the functions, $X_m(k)$ and $Y(k)$ . Substituting eq. (4) and eq. (5) into eq. (1), the decoding transformation can be simplified to:

$$Y(k) = \sum_{n=0}^{N-1} s(n)\cos\frac{(2k+1)\left(n+\frac{N}{4}+\frac{1}{2}\right)}{N}, \quad (6)$$

$$\text{when } n,k = 0,1,\ldots,N-1;$$

Next, $Y(k)$ in eq. (6) can be divided into two parts as follows:

$$Y(k) = \sum_{n=0}^{\frac{3N}{4}-1} s(n)\cos\frac{(2k+1)\left(n+\frac{N}{4}+\frac{1}{2}\right)\pi}{N} + \sum_{n=\frac{3N}{4}}^{N-1} s(n)\cos\frac{(2k+1)\left(n+\frac{N}{4}+\frac{1}{2}\right)\pi}{N} \quad (7)$$

Substituting new indices $$n' = n+\frac{3N}{4}$$

for the first summation, and $$n'' = n-\frac{3N}{4}$$

for the second summation, eq. (7) can be written as:

$$Y(k) = \sum_{n'=\frac{N}{4}}^{N-1} s\left(n'-\frac{N}{4}\right)\cos\frac{(2k+1)(2n'+1)\pi}{2N} - \sum_{n''=0}^{\frac{N}{4}-1} s\left(n''+\frac{3N}{4}\right)\cos\frac{(2k+1)(2n''+1)\pi}{2N} \quad (8)$$

From eq. (8), it is clear that the first and second terms are can be combined since they have same cosine functions. Circularly shifting the time sequence s (n) by N/4 sequence length and with the change in sign, a new time sequence y(n) is obtained:

$$y(n'') = -s\left(n''+\frac{3N}{4}\right),\ \text{when } n'' = 0,1,\ldots,\frac{N}{4}-1 \quad (9)$$

$$y(n') = s\left(n'-\frac{N}{4}\right),\ \text{when } n' = \frac{N}{4}, \frac{N}{4}+1,\ldots,N-1 \quad (10)$$

Eq. (9) and eq. (10) show that the first quarter of the time sequence y(n) is composed of the negative of the last quarter of the time sequence s(n), and that the last three quarters of the time sequence y(n) are composed of the first three quarters of s(n). With these two equations, eq. (8) can be rewritten as:

$$Y(k) = \sum_{n=0}^{N-1} y(n)\cos\frac{(2k+1)(2n+1)\pi}{2N} \quad (11a)$$

$$= \sum_{n=0}^{\frac{N}{2}-1} (y(n)-y(N-1-n))\cos\frac{(2k+1)(2n+1)\pi}{2N} \quad (11b)$$

From eq. (11a), it is clear that $$Y(k) = -Y(N-1-k),\ \text{when } k = 0,1,\ldots,\frac{N}{2}-1 \quad (12)$$

Eq. (11b), derived from eq. (1), is a standard discrete cosine transformation of the fourth type (DCT-IV) with N/2 data points. In principle, it can be carried out with current well-developed techniques. However, the DCT in eq. (11b) can be further simplified. Using the formula of trigonometric sum, the following expression can be derived:

$$Y(k) = U(k+1)+U(k),\ \text{when } k = 0,1,\ldots,\ldots,\frac{N}{2}-1 \quad (13)$$

$$U(k) = \sum_{n=0}^{\frac{N}{2}-1} u(n)\cos\frac{(2n+1)k\pi}{N} \quad (14)$$

$$u(n) = \{y(n)-y(N-1-n)\}\left\{\frac{1}{2\cos\frac{(2n+1)\pi}{2N}}\right\}. \quad (15)$$

Eqs. (13), (14) and (15) are the encoding method used in the encoding end of this preferred embodiment. In these expressions, each signal frame is multiplied by an analysis window function h(n) for the cancellation of the time-domain aliasing. Therefore, the denominator $$\frac{1}{2\cos\frac{(2n+1)\pi}{2N}}$$

in eq. (15) and the minus sign in eq. (9) can be combined with the analysis window function h(n) in eq. (4) to obtain a modified analysis windowing function, that is:

$$s(n)=x_m(n)w_E(n) \quad (16)$$

where $$w_E(n) = \frac{h(N-1-n)}{2\cos\left\{\frac{(2n+1)\pi}{2N}+\frac{\pi}{4}\right\}}, \quad (17a)$$

$$\text{when } 0 \leq n \leq \left(\frac{N}{4}-1\right);$$

-continued $$w_E(n) = \frac{h(N-1-n)}{2\cos\left\{\frac{(2n+1)\pi}{2N} - \frac{3\pi}{4}\right\}}, \quad \text{when } \frac{N}{2} \leq n \leq \left(\frac{N}{2} - 1\right); \tag{17b}$$

$$w_E(n) = \frac{h(N-1-n)}{2\cos\left\{\frac{(2n+1)\pi}{2N} - \frac{3\pi}{4}\right\}}, \quad \text{when } \frac{N}{2} \leq n \leq \left(\frac{3N}{4} - 1\right); \tag{17c}$$

$$w_E(n) = \frac{h(N-1-n)}{2\cos\left\{\frac{(2n+1)\pi}{2N} + \frac{\pi}{4}\right\}}, \quad \text{when } \frac{3N}{4} \leq n \leq (N-1). \tag{17d}$$

Because the modified analysis window function $W_E(n)$ can be calculated in advance, the amount of calculation in eq. (16) is equal to that required by the analysis window function in eq. (4). Since the multiplication with $$\frac{1}{2\cos\frac{(2n+1)\pi}{2N}}$$

in eq. (15) is moved to windowing function, the calculation of eq. (15) becomes:

$$u(n)=y(n)-y(N-1-n) \tag{18}$$

The calculations of the decoding device are defined by eqs. (2) and (3). Once the decoder receives the frequency sequence $X_m(k)$ with length N, $Y(k)=(-1)^{mk} X_m(k)$ can be generated by utilizing the definition of eq. (5) to change the sign in alternate terms according to the value of mk. Therefore, eq. (2) can be simplified to $$q_m(n) = \frac{1}{N}\sum_{k=0}^{N-1} Y(k)\cos\frac{\pi(2k+1)\left(2n+1+\frac{N}{2}\right)}{2N} \tag{19}$$

Similarly, since the factor 1/N in eq. (19) can be combined with the synthesis window function f(n), eq. (19) can be rewritten as:

$$q_m(n) = \sum_{k=0}^{N-1} Y(k)\cos\frac{\pi(2k+1)\left(2n+1+\frac{N}{2}\right)}{2N} \tag{20}$$

Similar to the procedure used in the encoding device, the time frame $q_m(n)$ can also be obtained from the discrete cosine transform using Y(k) as the input, with data reordering. To illustrate this procedure more clearly, let y(n) be the output of the DCT using Y(k) in the frequency domain as input:

$$y(n) = \sum_{k=0}^{N-1} Y(k)\cos\frac{(2k+1)(2n+1)\pi}{2N}, \text{ when } n = 0,1,\ldots,N-1 \tag{21}$$

Comparing eqs. (2) and (21), it is clear that the first 3N/4 terms of the time frame $q_m(n)$ are identical to the last 3N/4 terms of y(n), as shown below:

$$q_m(n) = y\left(n + \frac{N}{4}\right), \text{ when } n = 0,1,\ldots,\frac{3N}{4} - 1 \tag{22}$$

and the negative of the last N/4 terms of $q_m(n)$ are equal to the first N/4 terms of y(n):

$$q_m(n) = -y\left(n - \frac{3N}{4}\right), \quad \text{when } n = \frac{3N}{4}, \frac{3N}{4}+1,\ldots,N-1 \tag{23}$$

According to eqs. (22) and (23), $q_m(n)$ can be obtained by circularly shifting y(n) with a length of N/4, similar to the operation in the encoder. Thus, using eq. (12), eq. (21) can be written as:

$$y(n) = \sum_{k=0}^{\frac{N}{2}-1} 2Y(k)\cos\frac{(2k+1)(2n+1)\pi}{2N} \tag{24}$$

Similarly, y(n) satisfies the following equation:

$$y(n) = -y(N-1-n), \text{ when } n = 0, 1, \ldots, \frac{N}{2} - 1, \tag{25}$$

Eq. (24)) is similar to eq. (11b), thus, the same expression for eq. (24)) can be used:

$$y(n) = \frac{1}{2\cos\frac{(2n+1)\pi}{2N}} z(n); \tag{26}$$

$$z(n) = \sum_{k=0}^{\frac{N}{2}-1} Z(k)\cos\frac{(2n+1)}{N}k\pi, \quad \text{when } n = 0,1,\ldots,\frac{N}{2}-1, \tag{27}$$

$$Z(k) = \begin{Bmatrix} 2Y(k-1) + 2Y(k) & \text{when } k = 1,2,\ldots,\frac{N}{2}-1 \\ 2Y(0) & \text{when } k = 0 \end{Bmatrix}. \tag{28}$$

The transformation in eq. (27) is the commonly used inverse discrete cosine transformation with length N/2. Thus, when combined with the synthesis window function in eq. (3), the time-domain aliasing cancellation can be achieved. Also, the parameter 1/N in eq. (19), the minus sign in eq. (23), and the multiplicand $$\frac{1}{2\cos\frac{(2n+1)\pi}{2N}} z(n)$$

in eq. (26) can be combined into the synthesis window function f(n) to form a modified synthesis window function $w_D(n)$, so as to minimize the amount of computation required. Using eq. (20), and eq. (22) to (26), the following can be obtained:

$$q_m(n) = z\left(n + \frac{N}{4}\right) \text{ when } n = 0,1,\ldots,\frac{N}{4} - 1 \tag{29a}$$

$$q_m(n) = z\left(\frac{3N}{4} - 1 - n\right) \quad \text{when } n = \frac{N}{4}, \frac{N}{4}+1,\ldots,\frac{N}{2}-1 \tag{29b}$$

$$q_m(n) = z\left(\frac{3N}{4} - 1 - n\right) \tag{29c}$$

-continued $$\text{when } n=\frac{N}{2},\frac{N}{2}+1,\ldots,\frac{3N}{4}-1$$

$$q_m(n)=z\left(n-\frac{3N}{4}\right) \quad (29d)$$

$$\text{when } n=\frac{3N}{4},\frac{3N}{4}+1,\ldots,N-1$$

Also, eq. (3) can be written as:

$$x_m(n)=w_D\left(n+\frac{N}{2}\right)q_{m-1}\left(n+\frac{N}{2}\right)+w_D(n)q_m(n). \quad (30)$$

in which the modified synthesis window functions are:

$$w_D(n)=\frac{f(n)}{2N\cos\left\{\frac{(2n+1)\pi}{2N}+\frac{\pi}{4}\right\}} \text{ when } 0\leq n\leq\left(\frac{N}{4}-1\right); \quad (31a)$$

$$w_D(n)=\frac{f(n)}{2N\cos\left\{\frac{(2n+1)\pi}{2N}-\frac{3\pi}{4}\right\}} \text{ when } \frac{N}{4}\leq n\leq\left(\frac{N}{2}-1\right); \quad (31b)$$

$$w_D(n)=\frac{f(n)}{2N\cos\left\{\frac{(2n+1)\pi}{2N}-\frac{3\pi}{4}\right\}} \text{ when } \frac{N}{2}\leq n\leq\left(\frac{3N}{4}-1\right); \quad (31c)$$

$$w_D(n)=\frac{f(n)}{2N\cos\left\{\frac{(2n+1)\pi}{2N}+\frac{\pi}{4}\right\}} \text{ when } \frac{3N}{4}\leq n\leq(N-1), \quad (31d)$$

where f(n) is the original synthesis window function of a coding system. Since the modified synthesis window function in eqs. (31a) through (31d) can be obtained in advance, this part of the calculation can be omitted completely.

Figure 1:
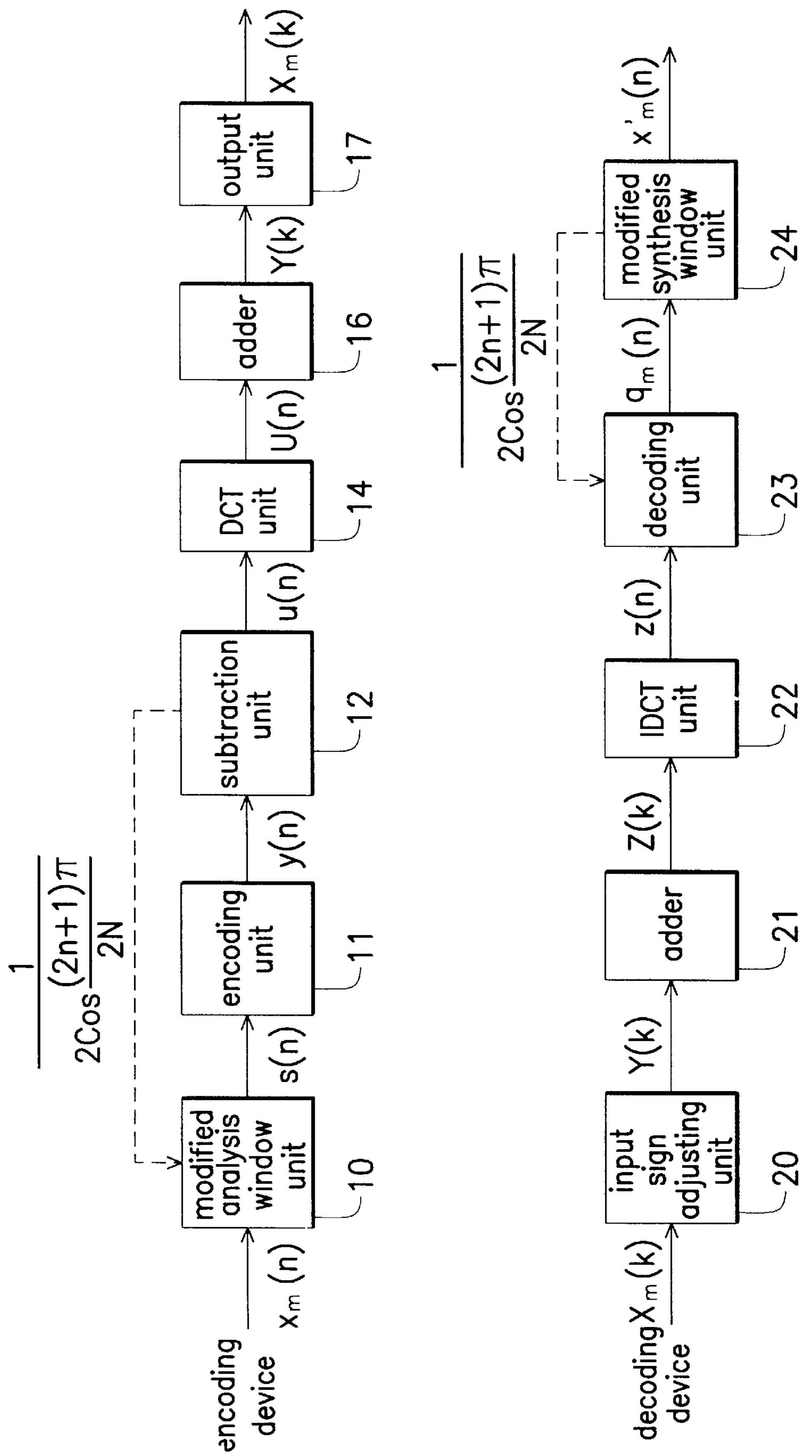
FIG. 1 is the system block diagram of a first preferred embodiment in accordance with the invention.

The apparatus using the method described above to perform the time-domain aliasing cancellation is shown in FIG. 1. This preferred embodiment of the TDAC apparatus include: an encoding device for TDAC encoding and to transform the m-th sequence $x_m(n)$ into the m-th sequence $X_m(k)$ in the frequency domain; and a decoding device for TDAC decoding and to transform the input sequence $X_m(k)$ in the frequency domain into the output sequence $x_m(n)$ in the time domain. Both the input time sequence $x_m(n)$ and frequency sequence $X_m(k)$ have N terms, N is a positive integer number. n, k, and m are integer numbers, denoting the ordering in the time domain, the frequency domain, and the index of the signal frame, respectively.

The modified synthesis window function unit 10 in the TDAC encoding device multiplies each input sequence $x_m(n)$ with the modified synthesis window function $W_E(n)$ to generate a first time sequence s(n) with length of N, as shown in eq. (16). The modified synthesis window function, as defined in eqs. (17a) through (17d), is formed by combining the original analysis window function h(n), the multiplicand $$\frac{1}{2\cos\frac{(2n+1)\pi}{2N}}$$

in eq. (15), and the minus sign in eq. (9). Next, the encoding unit 11 reorganizes the time sequence s (n) to generate a second time sequence y(n) with N terms. After the re-ordering, the data value in the first quarter of the second time sequence y(n) is composed of the data from the last quarter of the first time sequence s(n), and the data value of the last 3N/4 terms of the second time sequence y(n) will be composed of the data from the first 3N/4 terms of the first time sequence s(n), as shown in eqs. (9) and (10). Note that the minus sign in eq. (9) has been combined with the modified synthesis window function. Following the encoding unit 11, a subtracting unit 12 subtracts every term of the first half of the second time sequence y(n) with the terms from the second half of the time sequence in reverse order, and generates a third time sequence u(n) with length N/2, as shown in eq. (18). The DCT unit 14 performs the discrete cosine transformation in eq. (14) and transforms the third time sequence u(n) into the frequency sequence U(k) in the frequency domain. Next, a frequency sequence adder 16 combines the first frequency sequence U(k) according to eq. (13), and generate the second frequency sequence Y(k) with length N/2. Finally, the output unit 17 generates an encoded frequency sequence $X_m(k)$ with N terms from the second frequency sequence Y(k). The first N/2 terms of $X_m(k)$ are identical to Y(k), except with a phase factor of (−1)m, as defined in eq. (5). The second N/2 terms of $X_m(k)$ are generated according to eqs. (5) and (12), reversing the order of Y(k) and changing the sign with the phase factor (−1)m.

The input sign change unit 20 of the decoding device add the phase factor $(-1)^m$ to the input encoded frequency sequence $X_m(k)$ according to eq. (5) to compose a third frequency sequence Y(k). Afterward, adder 21 generates a fourth frequency sequence Z(k), according to the addition and multiplication by 2 described in eq. (28). Next, an IDCT transformer 22 operates on the fourth frequency sequence Z(k) to generate a fourth time sequence z(n) with N/2 terms. The transformation equation is described in eq. (27). The decoding unit 22 rearranges the fourth time sequence z(n) to produce a fifth time sequence $q_m(n)$ with N terms. The first N/4 terms of $q_m(n)$ are the second half terms of the fourth time sequence z(n), the second N/4 terms of $q_m(n)$ are obtained by reversing the order of the second half z(n), the third N/4 terms of $q_m(n)$ are the first half terms of z(n) with reversed order, and the last N/4 terms of $q_m(n)$ are the first half terms of z(n), as described by eqs. (29a) through (29b). The minus sign in eqs. (23) and (25), and the multiplicand $$\frac{1}{2\cos\frac{(2n+1)\pi}{2N}}$$

in eq. (26) is combined into the synthesis window function f(n). Finally, the modified synthesis window function unit 23 combines the fifth time sequence $q_m(n)$ and $q_{m-1}(n)$ with the modified synthesis window function $w_D(n)$ of eqs. (31a) through (31d) to generate the final sequence $x_m(n)$ as described in eq. (30), Table 1 is the comparison of computational complexities between the method of the first preferred embodiment according to the invention, the Radix-2 FFT method, and the SRFFT method. It is clear from Table 1 that the preferred embodiment according to the invention is faster in both multiplication and addition operations than both the Radix-2 FFT and SRFFT implementation methods.

TABLE 1

Comparison of the Computational Complexities Among Different Method

| Algorithm | No of Additions | No. of Multiplications |
|---|---|---|
| Radix-2 FFT | $\frac{3N \log N}{4}$ | $\frac{N(\log N + 2)}{2}$ |
| SRFFT | $\frac{N(3\log N - 1)}{4}$ | $\frac{N(\log N + 5)}{4}$ |
| First preferred embodiment | $\frac{N(3\log N - 3)}{4} + 1$ | $\frac{N(\log N + 3)}{4}$ |

Advantages of this preferred embodiment are:

1. The well-developed DCT and IDCT techniques can be used to replace the FFT technique suggested by the AC-3 standard for TDAC.

2. The number of multiplications and additions required are smaller than the FFT technique suggested by the AC-3 standard for TDAC, thus the speed is much faster than the commonly used TDAC technique.

3. The data reordering used to convert the FFT into DCT is a relatively simple circular shifting. Also, the technology to perform DCT was already well-developed. Thus, this preferred embodiment is easier to implement, as well as with less capital cost.

Embodiment 2

This preferred embodiment employs the DCT-IV transformation used for data encoding and decoding, and the data reordering in the first preferred embodiment. The Goretzel rule is used to convert the DCT-IV transformation to a 2nd order Infinite Impulse Response (IIR) filter. Therefore, the encoding device and the decoding device of this preferred embodiment can be constructed with identical hardware. This greatly simplifies the hardware requirement. Only simple comparators and adders are required to construct an addresser to control the input order of the IIR filter. The following sections describe the principle and implementation of this preferred embodiment.

In the derivation of the method of the first preferred embodiment, the DCT transformation in the encoding equation (11b) and the decoding equation (24)) can be written in a common form:

$$V(k) = \sum_{n=0}^{\frac{N}{2}-1} v(n)\cos\frac{(2k+1)(2n+1)\pi}{2N} \tag{32}$$

For the encoding equation (11b), v(n) equals to y(n)−y(N−1−n), and V(k) equals to Y(k). In the decoding equation (24)), v(n) equals to 2Y(n), and V(k) equals to y(k). According to Goretzel's rule, eq. (32) can be rewritten as a convolution equation:

$$\begin{aligned} V(k) &= (-1)^k \sum_{n=0}^{\frac{N}{2}-1} v(n)\sin\frac{(2k+1)\left(2\left(\frac{N}{2}-1-n\right)+1\right)\pi}{2N} \\ &= (-1)^k\{v(n)*h_k(n)\}\Big|_{n=\frac{N}{2}-1} \quad \text{for } k=0,1,\ldots,\frac{N}{2}-1 \end{aligned} \tag{33}$$

where "*" denotes the convolution operator, and the impulse response function $h_k(n)$ is defined as:

$$h_k(n) = \sin\frac{(2n+1)(2k+1)\pi}{2N} \tag{34}$$

Applying the z-transformation to the impulse response function $h_k(n)$, $H_k(z)$ may be obtained as:

$$\begin{aligned} H_k(z) &= \sum_{n=0}^{\infty} \sin\frac{(2k+1)(2n+1)}{2N} z^{-n} \\ &= \sum_{n=0}^{\infty} \frac{e^{j\frac{(2k+1)(2n+1)\pi}{2N}} - e^{-j\frac{(2k+1)(2n+1)\pi}{2N}}}{2j} z^{-n} \\ &= \frac{\sin\frac{(2k+1)\pi}{2N}(1+z^{-1})}{1-2\cos\frac{(2k+1)\pi}{N}z^{-1}+z^{-2}} \end{aligned} \tag{35}$$

Figure 2:
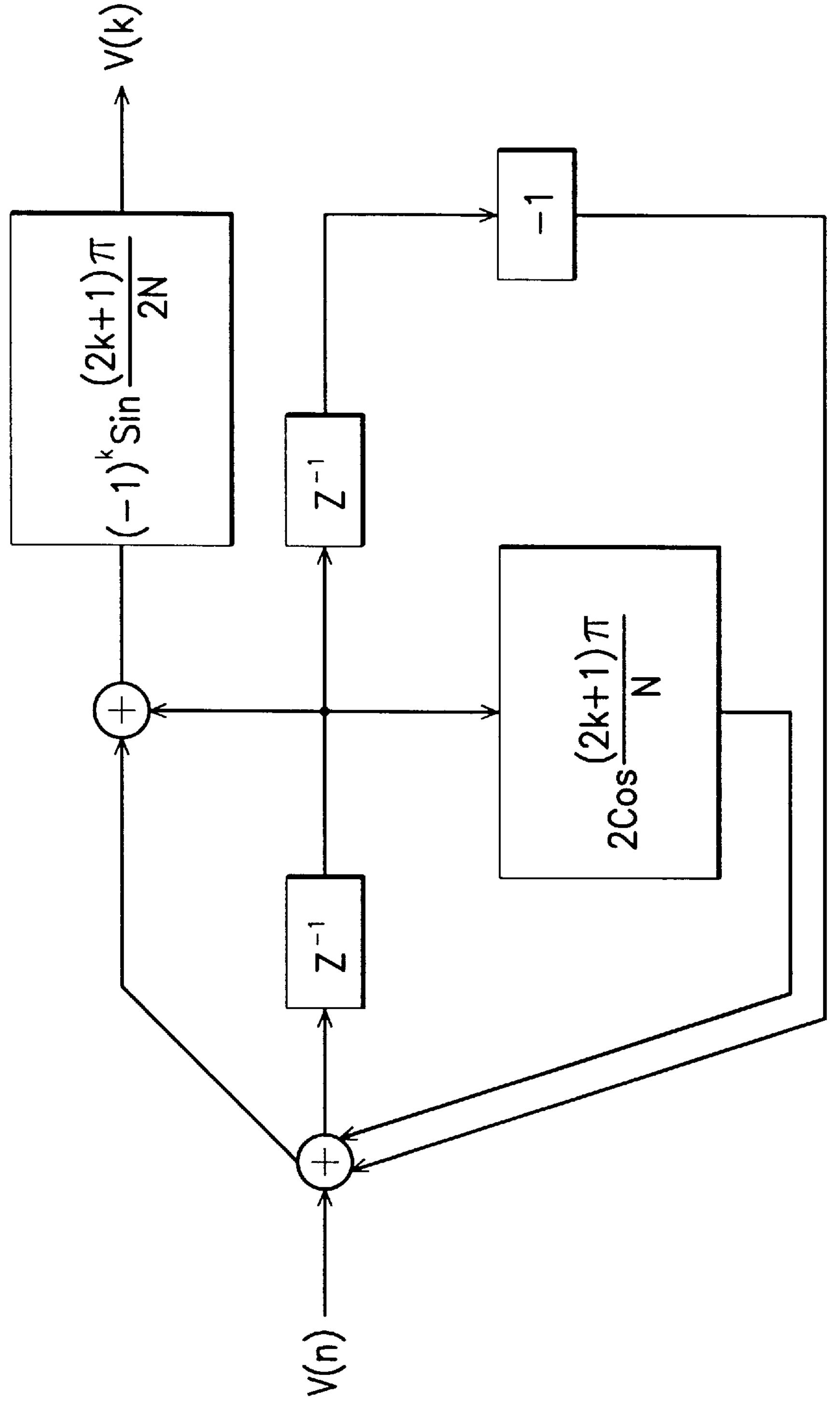
FIG. 2 is the block diagram of the 2nd-order IIR filter of the second preferred embodiment in accordance with the invention.

FIG. 2 shows the block diagram of the 2nd order IIR filter of Eq. (35) combined with a simple factor $(-1)^k$ that gives Eq. (33). Calculation of the denominator of eq. (35) can be achieved by an adder and a multiplication unit with a multiplicand of $$(-1)^k\sin\frac{(2k+1)\pi}{2N}$$

at the output. The numerator of eq. (35) with the factor $(-1)^k$ can be realized with a multiplication unit with a multiplicand of $$2\cos\frac{(2k+1)\pi}{N}$$

in a recursive loop. Thus, given an input time sequence v(n) with N/2 terms, and by applying appropriate sine and cosine multiplicands, the output time sequence V(k) can be obtained by using eq. (34). Since only one operation is needed for the adder and multiplication unit at the output for each V(k), only N/2 multiplication and N−2 addition operations are needed. In addition, N/2 sine and cosine multiplicands must be pre-stored in memory for a output time sequence V(k) with N/2 terms. In order to simply the structure of the TDAC apparatus and also achieve better Signal-to-Noise Ratio (SNR), the values of the multiplicands of IIR filter can be fixed as discussed below. From eq. (32), it is clear that the transformation basis for any value of k can also be found in the transformation basis for other k value, due to the symmetry between n and k in the argument of the cosine function. Thus, one of the cosine terms from the N/4 terms in the first quadrant (k=0,1, . . . , N/4-1) can be selected and use it as the fixed multiplicand of the IIR filter. If k=J is the selected index for the constant multiplicands 2cos((2J+1)π/2N) and 2sin((2J+1)π/2N), in (35); by sending the time sequence v(n) in the normal order into the IIR filter, V(J) is obtained. When calculating V(k) with a different k value, the time sequence v(n) is permuted and sent to the IIR filter. The transformation of eq. (32) is performed with the new permuted time sequence to obtain a new V(k). The permutation of the time sequence for index k is:

$$v'(n)=(-1)^{S_J(k,n)}v(P_J(k,n)) \tag{36}$$

where $S_J(k, n)$ is equal to 0 or 1. It is used to correct the sign of the cosine function, and $P_J(k, n)$ represents a reordering function. Both $S_J(k, n)$ and $P_J(k, n)$ are functions of the indices J, k and n. Substitute eq. (36) into (32), the following expressions may be obtained:

$$\begin{aligned} V'(J) &= \sum_{n=0}^{\frac{N}{2}-1} v'(n)\cos\frac{(2J+1)(2n+1)\pi}{2N} \\ &= \sum_{n=0}^{\frac{N}{2}-1} (-1)^{S_J(k,n)}v(P_J(k,n))\cos\frac{(2J+1)(2n+1)\pi}{2N} \\ &= \sum_{n=0}^{\frac{N}{2}-1} v(n')(-1)^{S_J(k,n)}\cos\frac{(2J+1)(2n+1)\pi}{2N} \end{aligned} \tag{37}$$

wherein $n'=P_J(k, n)$ is a function of indices J, k, and n. Using this new index n' in eq. (32), there is:

$$V(k) = \sum_{n'=0}^{\frac{N}{2}-1} v(n')\cos\frac{(2k+1)(2n+1)\pi}{2N}. \tag{38}$$

Since there is a one-to-one correspondence between indices n' and n, thus, using the reordered time sequence v(n'), the transformation described by eq. (38) will yield identical result as the transformation of eq. (32). Because the transformations of eqs. (37) and (38) require knowledge of $S_J(k, n)$ and $P_J(k, n)$, the following sections describe the procedure to solve for $S_J(k, n)$ and $P_J(k, n)$.

To solve for the reordering function $P_J(k, n)$, first find the cosine terms from eqs. (37) and (38) with the same value. Next, the phase between these cosine terms is used to determine $S_J(k, n)$. Let $\tilde{n}$ be the intermediate solution for $P_J(k, n)$, then the cosine terms with the same amplitude may be used in eq. (37) and (38) to find $\tilde{n}$:

$$(2J+1)(2n+1)\big|_{\mathrm{mod}2N} = (2k+1)(2\tilde{n}+1)\big|_{\mathrm{mod}2N} \quad \text{for } n = 0, 1, \ldots, \frac{N}{2}-1 \tag{39}$$

In this equation, mod N' denotes a modulus operation. According to Number Theory, eq. (33) can be simplified to:

$$(2k+1)\tilde{n}\big|_{mod\ N}=(2J+1)n+J-k\big|_{mod\ N} \tag{40}$$

because N is equal to some power of 2, it does not have any common denominator with 2k+1. Thus, eq. (40) has a unique solution between 0 and N−1. This preferred embodiment uses the finite state machine to calculate the index $\tilde{n}$.

The hardware implementation of mod N" ($N=2^m$) operation is to express the operand using binary representation, then keeping only m least significant bits (LSBs) and dropping the most significant bits (MSBs). Next, two m-bit accumulators are needed to find $\tilde{n}$. They are referred to as the right and left accumulator, and are used to perform the calculation on the right-hand-side and left-hand-side of eq. (40), respectively. When n=0, the content of the right accumulator is (J+2N−k). Here (2N−k) replaces (−k) such that the content of the right accumulator can be maintained positive. Meanwhile, the left accumulator starts from 0 (i.e., $\tilde{n}$=0), incrementing by (2k+1) until the contents of the left and right accumulator are identical. The number of increments is the solution for $\tilde{n}$ in eq. (33) for n=0. When n=1, the right accumulator increments by (2J+1), and the left accumulator increments by (2k+1) from 0, until the contents of the two accumulators are identical again. Similarly, the number of increments will be the solution for $\tilde{n}$ with n=1. The solutions for other values of n can be found similarly.

Note that because the value of the reordering index $n'=P_J(k, n)$ is between 0 and (N/2−1), the following two equations are applied to adjust $\tilde{n}$ to obtain the final reordering index n:

$$n' = P_J(k,n) = \tilde{n}, \quad \text{if } \tilde{n} \leqq \left(\frac{N}{2}-1\right) \tag{41}$$

$$n' = P_J(k,n) = (N-1-\tilde{n}), \quad \text{if } \tilde{n} \geqq \left(\frac{N}{2}-1\right) \tag{42}$$

Eqs. (41) and (42) simply mean that when $\tilde{n}$ is less than or equal to (N/2−1), $n'=\tilde{n}$; and when $\tilde{n}$ is greater than (N/2−1), $\tilde{n}$ is the solution found with a search in the clockwise direction starting from a phase angle of 90°. Therefore, the real reordering index n' should be $(N-1-\tilde{n})$.

The function $S_J(k, n)$ is determined from the number of carry-over in the left and right accumulators. For the accumulators, increment of n is equivalent to increasing the phase angle of the cosine terms in eqs. (37) and (38) by 90°. Two 1-bit counters can be used to keep track of the number of carry-over of the left and right accumulator. The value of the parameter $S_J(k, n)$ must be determined according to whether $\tilde{n}$ is greater than (N/2−1), or less than (N/2−1).

If $\tilde{n}$ is smaller than or equal to (N/2−1), and the content of the carry bit of the left and right accumulators are both 1 or 0, then the phase angles of the two cosine terms are in the same quadrant, i.e., there is no sign change and $S_J(k, n)=0$. However, if the contents of the two 1-bit counter are not the same, i.e., if one of the value of the counter is 0, and the other is 1, then, the phase angles of the two cosine terms differ by 180°, and the sign of the two cosine terms needs to be changed, that is, $S_J(k, n)=1$. On the other hand, when $\tilde{n}$ is greater than (N/2−1), then the situation is reversed. Thus, combining the above two cases, the parameter $S_J((k, n))$ is determined by $$S_J((k,n)) = XOR(\alpha,\beta), \text{ if } \tilde{n} \leqq \left(\frac{N}{2}-1\right) \tag{43}$$

$$S_J((k,n)) = \text{NOT}\,\{XOR(\alpha,\beta)\}, \text{ if } \tilde{n} > \left(\frac{N}{2}-1\right) \tag{44}$$

where α and β are the value of the 1-bit counters of the left and right accumulator, respectively.

Figure 3:
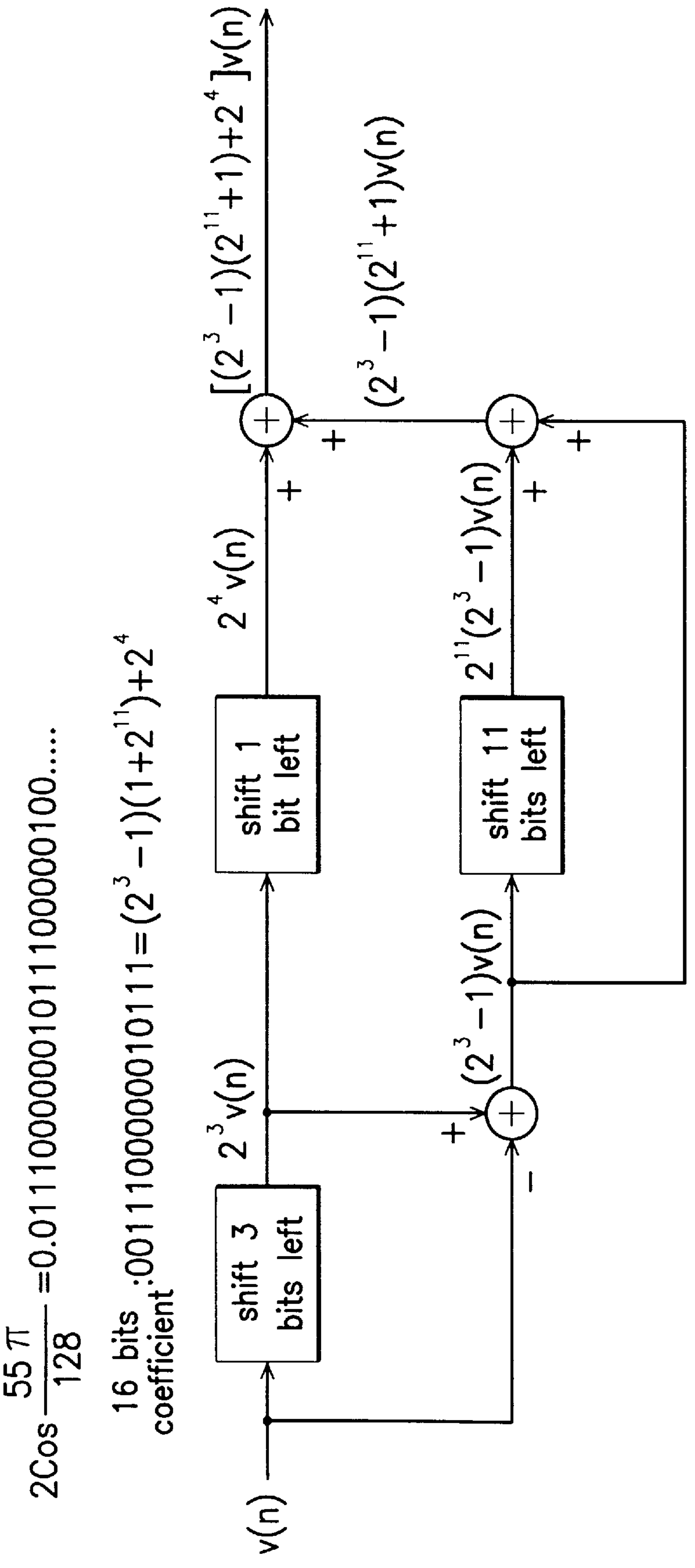
FIG. 3 shows the block diagram of the 16 valid digits when performing the multiplication of $$2\cos\frac{55\pi}{128}$$

In general, a multiplier with a fixed multiplicand is simpler to implement compared with a general-purpose multiplier. In this preferred embodiment, the multiplicand for the cosine terms in FIG. 2 can be selected from one of the N/4 cosine terms $$\left\{ \cos\frac{(2k+1)\pi}{N},\ k = 0, 1, \ldots, \frac{N}{4}-1 \right\}$$

to be used as the constant coefficient of the IIR filter. The following descriptions illustrate the rule for selecting this constant coefficient followed by this preferred embodiment: In order to minimize the number of addition operations used by the multiplication operation, it is desirable that the binary representation of the multiplicand has a highly ordered form, i.e., the 0's and 1's should be grouped closely together. FIGS. 3 and 4 show the block diagram to carry out the 16-bit multiplication for $$2\cos\frac{55\pi}{128} \text{ and } 2\cos\frac{64\pi}{128}$$

with N=128. In both figures, only 3 adders and several shifters are used. The operations and the results of these adders and shifters are denoted in the figure. It must be noted that, since there are only finite number of digits available, it is desirable to select the term with smaller value as the constant coefficient for the IIR filter to suppress the propagation error of the IIR filter during the recursive process. Also, the round-off error can be minimized by using a multiplicand with smaller number of truncated bits. Although this preferred embodiment does not limit the value of the constant coefficient of the IIR filter, by suitable choice of the multiplicand it is possible to improve the efficiency of the operation and also simplify the hardware implementation.

On the other hand, the constant multiplicand at the output of the IIR filter, $$(-1)^J\sin\frac{(2J+1)\pi}{2N},$$

is independent of k and n, thus, it is effectively a constant amplitude scalar. Therefore, it can be combined with any multiplicand within the system. For example, it can be combined with the analysis window function h(n) of the encoding device and the synthesis window function f(n) of the decoding device. That is, the analysis window function h(n) becomes $$w_E(n) = (-1)^J h(n)\sin\frac{(2J+1)\pi}{2N}, \quad (45)$$

and the synthesis window function f(n) becomes $$w_D(n) = (-1)^J f(n)\sin\frac{(2J+1)\pi}{2N}, \quad (46)$$

Thus, the multiplication at the output of the IIR filter can be omitted.

FIG. 5 shows the block diagram for a recursive discrete cosine transformation for a six-channel audio signal processor according to this preferred embodiment. The six input channels are represented by $v_1(n), \ldots, v_6(n)$ as described before, these signals represent the term y(n)−y(N−1−n) and 2Y(k) in the encoding device and the decoding device, respectively. Each N/2 terms of the input signals for each channel are stored in buffer 311~316. Each channel uses $P_J((k, n))$ as the address of the address unit 32 to select a suitable value for each buffer, multiplies it by a phase factor $(-1)^{S_J((k,n))}$ to make sign correction, and sequentially sends them to the IIR filter 40 through the channel selector 34 and the multiplexer 30. The structure of the IIR filter 40 is similar to that of FIG. 2, including 3 adders (411, 412, 413) and time delays (414, 415) which replace the calculation of $z^{-1}$. The differences between the IIR filter of FIG. 5 and FIG. 2 are that the multiplication in the recursive loop is accomplished by a constant coefficient multiplier 416. The multiplicand is $$2\cos\frac{(2J+1)\pi}{N}$$

and the multiplication at the output unit is simplified since it is combined with the analysis window function and the synthesis window function. Finally, the output V(k) of the six channels are obtained from the demultiplexer 36.

Summarizing the descriptions above, FIG. 6 shows the system block diagram of a TDAC apparatus according to this preferred embodiment of the invention. This preferred embodiment processes only one of the input sequence $x_m(n)$. However, using multitasking technique, it is possible to process the time sequence of all six channels simultaneously. The function of the modified analysis window unit 50, encoding unit 51, subtraction unit 52 and output unit 57 are identical to those in the first preferred embodiment, and will not be discussed here. However, the modified analysis window function is improved, as shown in eq. (45). The time sequence v(n), obtained by processing the input time sequence $x_m(n)$ through the above mentioned three processing units, is the y(n)−y(N−1−n) term in the first preferred embodiment. Next, v(n) is stored in buffer 53 with N/2 registers. Using the parameters $P_J(n, k)$ and $S_J(n, k)$ to reorganize the times sequence, and sending it to the digital filter 56, the encoded frequency sequence Y(k) can be obtained. Address unit 54 generates the parameters $P_J(n, k)$ and $S_J(n, k)$, retrieving the time sequence v(n) from the buffer 53, and using the parameters $P_J(n, k)$ and $S_J(n, k)$ to reorganize v(n) to generate the time sequence v'(n). Sign adjustment unit 55 uses parameter $S_J(n, k)$ to adjust the sign of each term of v'(n). Afterward, Y(k) uses output unit 57 to generate the TDAC encoded frequency sequence $X_m(k)$.

Once the encoded frequency sequence $X_m(k)$ arrives at the decoding device, the sign of each term of $X_m(k)$ is adjusted by the input sign adjustment unit 60, and then multiplied by 2 by shifting it to the left to generate the frequency sequence 2Y(k). Next, applying the same technique as in the encoding unit, using buffer 61, address unit 62, sign adjustment unit 63 and digital filter 65, $Y_m(k)$ may be transformed into a time sequence y(n) . An output sequence $x'_m(n)$ can be obtained by applying the same technique used in the first preferred embodiment with the decoding unit 65 and modified synthesis window function unit 66. The input sign adjustment unit, encoding unit, and the modified synthesis window function unit are also identical to those of the first preferred embodiment, except that the modified synthesis window function $W_D(h)$ is changed to that shown in eq. (46).

FIG. 7 shows the system block diagram of the second preferred embodiment of a TDAC apparatus according to the invention which simultaneously provides the encoding and decoding functions. Comparing with FIG. 6 it is clear that the circuit unit 100 and 200 have identical structure. Therefore, the encoding device and the decoding device of this preferred embodiment can incorporate a structure similar to what is shown in FIG. 7 to reduce the complexity of the circuit, and thus requires only a small die size if VLSI processes are used to manufacture this TDAC apparatus.

When employing this preferred embodiment with the high-fidelity audio signal compression technique AC-3 with six channels, it is necessary to verify that the recursive discrete cosine transform can be executed in real time. Assuming that the sampling rate of the audio signal processor is fs Hz. For each discrete cosine transformation for an input time sequence with N/2 points, there are N/2 reordering and N/2 filtering operations involved. Thus, the total number of recursive loops in the filter is N2/4. Therefore, the bandwidth requirement to real-time process M audio channels simultaneously is $$\eta = \left(M\frac{N^2}{4}\right) / \left(\frac{N}{2}\ \frac{1}{fs}\right) = \frac{MNfs}{2} \text{ (1/second)} \quad (47)$$

In the technical specification of AC-3 standard, fs=48 MHz, M=6, and N=512. Thus, the bandwidth of the filter needs to be at least 74 MHz. Furthermore, in order to achieve 18 bits sound quality, it maybe necessary to use a 32-bit processor in the filter. However, a 32 bits Digital Signal Processor (DSP) running at 74 MHz is not currently available. Since this preferred embodiment uses only multiplier with constant multiplicand, and in practice, the multiplication operation can be achieved with only a few adders, therefore it can easily achieve the required bandwidth. This is one of the advantages of this preferred embodiment.

The number of calculations required in the second preferred embodiment is at the order of $N^2/4$, larger than the number of calculations required by the first preferred embodiment. However, since only adders are needed for these calculations, its hardware structure is simpler, and is more suitable for VLSI implementation.

This preferred embodiment has the following advantages:

1. The multiplication in the 2nd order IIR filter uses only constant multiplicand, thus, it can be achieved with only addition operations; also, the operations can be further simplified by suitable choice of the multiplicand.

2. By fixing the coefficient of the IIR filter the round-off error can be minimized, therefore improving the quality of the audio signal compression system.

3. The hardware structure is simpler, resulting in a smaller die size when implemented with VLSI technology.

The disclosed preferred embodiments are meant to illustrate the principle of the invention, and by no mean is it the limit of the invention. The contents of the invention are defined in the following claims.

What is claimed is:

1. A time domain aliasing cancellation apparatus comprising an encoding device and a decoding device, said encoding device performing time-domain aliasing cancellation encoding for transforming an m-th input signal frame $x_m(n)$ in the time domain into an m-th signal frame $X_m(k)$ in the frequency domain, said decoding device performing time-domain aliasing cancellation decoding for transforming said input frequency-domain signal frame $X_m(k)$ back to a time-domain signal frame $x'_m(n)$, said time-domain signal frame $x_m(n)$ and $x'_m(n)$ and frequency-domain signal frame $X_m(k)$ having N terms wherein N is a positive integer number and n, k, and m are integers, said encoding device of the time-domain aliasing cancellation apparatus comprising:

a modified analysis window function unit for multiplying individual terms of the input time-domain signal frame $x_m(n)$ with a modified analysis window function $w_E(n)$, thereby generating a first time sequence s(n) expressed as: $s(n)=x_m(n)w_E(n)$, wherein $$w_E(n) = \frac{h(N-1-n)}{2\cos\left\{\frac{(2n+1)\pi}{2N} + \frac{\pi}{4}\right\}} \quad \text{when } 0 \leqq n \leqq \left(\frac{N}{4} - 1\right),$$

$$w_E(n) = \frac{h(N-1-n)}{2\cos\left\{\frac{(2n+1)\pi}{2N} - \frac{3\pi}{4}\right\}}$$

$$\text{when } \frac{N}{4} \leqq n \leqq \left(\frac{N}{2} - 1\right),$$

$$w_E(n) = \frac{h(N-1-n)}{2\cos\left\{\frac{(2n+1)\pi}{2N} - \frac{3\pi}{4}\right\}}$$

$$\text{when } \frac{N}{2} \leqq n \leqq \left(\frac{3N}{4} - 1\right), \text{ and}$$

-continued $$w_E(n) = \frac{h(N-1-n)}{2\cos\left\{\frac{(2n+1)\pi}{2N} + \frac{\pi}{4}\right\}} \quad \text{when } \frac{3N}{4} \leqq n \leqq (N-1)$$

wherein h(n) is the original analysis window function of a coding system;

an encoding unit, rearranging said first time sequence s(n) for generating a second time sequence y(n) with length N, the first N/4 terms of said second time sequence y(n) being composed of the last N/4 terms of said first time sequence s(n), and the last 3N/4 terms of y(n) being composed of the first 3N/4 terms of s(n);

a subtraction unit for subtracting from the N/2 terms of said second time sequence y(n) the terms in the second half of said time sequence in reversed order and generating a third time sequence u(n) expressed as: $u(n)=y(n)-y(N-1-n)$;

a discrete cosine transform unit, performing a discrete cosine transformation on said third time sequence u(n) for generating a first frequency sequence U(k), wherein k is an integer, and the transformation equation being expressed as $$U(k) = \sum_{n=0}^{\frac{N}{2}-1} u(n)\cos\frac{(2n+1)k\pi}{N};$$

a frequency sequence adder, utilizing said first frequency sequence U(k) for generating a second frequency sequence Y(k) with length N/2 expressed as $Y(k)=U(k+1)+U(k)$; and an output unit, using said second frequency sequence Y(k) for generating an output encoded frequency sequence $X_m(k)$ with length N, the first N/2 terms of $X_m(k)$ being Y(k) multiplied by a phase factor $(-1)_m k$ and expressed as $X_m(k)=(-1)^{mk}Y(k)$, and the last N/2 terms of $X_m(k)$ being Y(k) multiplied by a phase factor $(-1)^{mk+1}$ in reversed order and expressed as $X_m(k)=(-1)^{mk+1}Y(N-k-1)$, and said decoding device of the time-domain aliasing cancellation apparatus comprising:

an input sign adjustment unit, adding a phase factor of $(-1)^{mk}$ to the frequency sequence $X_m(k)$ and generating a third frequency sequence Y(k) expressed as $Y(k)=(-1)^{mk}X_m(k)$;

an adder, utilizing said third frequency sequence Y(k) for generating a fourth frequency sequence Z(k) with length N/2 wherein $Z(k)=2Y(k-1)+2Y(k)$ when k is between 1 to N/2−1 and $Z(k)=2Y(0)$ when k equals zero;

an inverse discrete cosine transformation unit, performing an inverse discrete cosine transformation on said fourth frequency sequence Z(k) for generating a fourth time sequence z(n) with length N/2, the transformation equation being $$z(n) = \sum_{k=0}^{\frac{N}{2}-1} Z(k)\cos\frac{(2n+1)k\pi}{N};$$

decoding unit, rearranging said fourth time sequence z(n) for generating a fifth time sequence $q_m(n)$, wherein the first N/4 terms of $q_m(n)$ are composed of the second half of z(n), the second N/4 terms of $q_m(n)$ are composed of the second half of z(n) in reversed order, the third N/4 terms of $q_m(n)$ are the first half of z(n) in reversed order, and the last N/4 terms of $q_m(n)$ are the first half of the fourth time sequence z(n); and a modified synthesis window function unit for multiplying said fifth time sequence $q_m(n)$ and the previous input time sequence $q_{m-1}(n)$ by a modified synthesis window function $w_D(n)$ for generating an output time sequence $x'_m(n)$ expressed as $$x'_m(n) = w_D\left(n+\frac{N}{2}\right)q_{m-1}\left(n+\frac{N}{2}\right) + w_D(n)q_m(n)$$

with $$w_D(n) = \frac{f(n)}{2N\cos\left\{\frac{(2n+1)\pi}{2N}+\frac{\pi}{4}\right\}} \text{ when } 0 \leqq n \leqq \left(\frac{N}{4}-1\right),$$

$$w_D(n) = \frac{f(n)}{2N\cos\left\{\frac{(2n+1)\pi}{2N}-\frac{3\pi}{4}\right\}} \text{ when } \frac{N}{4} \leqq n \leqq \left(\frac{N}{2}-1\right),$$

$$w_D(n) = \frac{f(n)}{2N\cos\left\{\frac{(2n+1)\pi}{2N}-\frac{3\pi}{4}\right\}} \text{ when } \frac{N}{2} \leqq n \leqq \left(\frac{3N}{4}-1\right), \text{ and}$$

$$w_D(n) = \frac{f(n)}{2N\cos\left\{\frac{(2n+1)\pi}{2N}+\frac{\pi}{4}\right\}} \text{ when } \frac{3N}{4} \leqq n \leqq (N-1)$$

wherein f(n) is an original synthesis window function.

2. The time domain aliasing cancellation apparatus according to claim 1, wherein said original analysis window function h(n) is equal to said original synthesis window function f(n).

3. A time domain aliasing cancellation method comprising an encoding method and a decoding method, said encoding method performing time domain aliasing cancellation encoding for transforming an m-th signal frame $x_m(n)$ in the time domain into an m-th signal frame $X_m(k)$ in the frequency domain, said decoding method performing time domain aliasing cancellation decoding for transforming said input frequency-domain signal frame $X_m(k)$ back to a time-domain signal frame $x'_m(n)$, said time-domain signal frames $x_m(n)$ and $x'_m$ (n) and said frequency-domain signal frame $X_m(k)$ having N terms wherein N is a positive integer number, and n, k, and m are integers, said encoding method of the time-domain aliasing cancellation method comprising the steps of multiplying individual terms of said input time-domain signal frame $x_m(n)$ by a modified analysis window function $w_E(n)$ for generating a first time sequence s(n) with length N expressed as: $s(n)=x_m(n)w_E(n)$ with $$w_E(n) = \frac{h(N-1-n)}{2\cos\left\{\frac{(2n+1)\pi}{2N}+\frac{\pi}{4}\right\}}$$

$$\text{when } 0 \leqq n \leqq \left(\frac{N}{4}-1\right),$$

-continued $$w_E(n) = \frac{h(N-1-n)}{2\cos\left\{\frac{(2n+1)\pi}{2N}-\frac{3\pi}{4}\right\}}$$

$$\text{when } \frac{N}{4} \leqq n \leqq \left(\frac{N}{2}-1\right),$$

$$w_E(n) = \frac{h(N-1-n)}{2\cos\left\{\frac{(2n+1)\pi}{2N}-\frac{3\pi}{4}\right\}}$$

$$\text{when } \frac{N}{2} \leqq n \leqq \left(\frac{3N}{4}-1\right), \text{ and}$$

$$w_E(n) = \frac{h(N-1-n)}{2\cos\left\{\frac{(2n+1)\pi}{2N}+\frac{\pi}{4}\right\}}$$

$$\text{when } \frac{3N}{4} \leqq n \leqq (N-1)$$

wherein h(n) is the original analysis window function;

rearranging said first time sequence s(n) for generating a second time sequence y(n) with length N, the first N/4 terms of said second time sequence y(n) being composed of the last N/4 terms of said first time sequence s(n), and the last 3N/4 terms of y(n) being composed of the first 3N/4 terms of s(n);

subtracting from the first N/2 terms of said second time sequence y(n) the terms in the second half of said time sequence in reversed order for generating a third time sequence u(n) expressed as: u(n)=y(n)−y(N−1−n);

performing a discrete cosine transformation on said third time sequence u(n) for generating a first frequency domain signal U(k) expressed as:

$$U(k) = \sum_{n=0}^{\frac{N}{2}-1} u(n)\cos\frac{(2n+1)k\pi}{N};$$

adding said first frequency sequence U(k) with neighboring terms thereof for generating a second frequency sequence Y(k) with length N/2 expressed as: Y(k)=U(k+1)+U(k); and rearranging said second frequency sequence Y(k) for generating said encoded output frequency sequence $X_m(k)$ with length N, the first N/2 terms of $X_m(k)$ being Y(k) multiplied by a phase factor $(-1)^{mk}$ expressed as: $X_m(k)=(-1)^{mk}Y(k)$, the last N/2 terms of $X_m(k)$ being Y(k) in reversed order and multiplied by a phase factor $(-1)^{mk+1}$ expressed as: $X_m(k)=-(1)^{mk+1}Y(N-k-1)$, and said decoding method comprising the steps of adding a phase factor of $(-1)^{mk}$ to said frequency sequence $X_m(k)$ for generating a third frequency sequence Yr(k) expressed as $Yr(k)=(-1)^{mk}X_m(k)$;

utilizing said third frequency sequence Yr(k) for generating a fourth frequency sequence Z(k) with length N/2, wherein Z(k)=2Yr(k−1)+2Yr(k) when k is between 1 to N/2−1, and Z(k)=2Yr(0) when k is equal to zero;

performing an inverse discrete cosine transform on said fourth frequency sequence Z(k) for generating a fourth time sequence z(n) expressed as $$z(n) = \sum_{k=0}^{\frac{N}{2}-1} Z(k)\cos\frac{(2n+1)k\pi}{N};$$

rearranging said fourth time sequence z(n) for generating a fifth time sequence $q_m(n)$ with length N, wherein the first ¼ of the terms of $q_m(n)$ being composed of the second half of z(n), the second N/4 terms of $q_m(n)$ being composed of the second half of z(n) in reversed order, the third N/4 terms of $q_m(n)$ being the first half of z(n) in reversed order, and the last N/4 terms of $q_m(n)$ being the first half of the fourth time sequence z(n); and multiplying said fifth time sequence $q_m(n)$ and the previous frame input time sequence $q_{m-1}$ (n) by a modified synthesis window function $W_D(n)$ for generating the output time sequence x (n) expressed as $$x'_m(n) = w_D\left(n+\frac{N}{2}\right)q_{m-1}\left(n+\frac{N}{2}\right) + w_D(n)q_m(n)$$

with $$w_D(n) = \frac{f(n)}{2N\cos\left\{\frac{(2n+1)\pi}{2N}+\frac{\pi}{4}\right\}}$$

when $0 \leqq n \leqq \left(\frac{N}{4}-1\right)$, $$w_D(n) = \frac{f(n)}{2N\cos\left\{\frac{(2n+1)\pi}{2N}-\frac{3\pi}{4}\right\}}$$

when $\frac{N}{4} \leqq n \leqq \left(\frac{N}{2}-1\right)$, $$w_D(n) = \frac{f(n)}{2N\cos\left\{\frac{(2n+1)\pi}{2N}-\frac{3\pi}{4}\right\}}$$

when $\frac{N}{2} \leqq n \leqq \left(\frac{3N}{4}-1\right)$, and $$w_D(n) = \frac{f(n)}{2N\cos\left\{\frac{(2n+1)\pi}{2N}+\frac{\pi}{4}\right\}}$$

when $\frac{3N}{4} \leqq n \leqq (N-1)$ wherein f(n) being the original analysis window function of a coding system.

4. A time domain aliasing cancellation apparatus comprising an encoding device and a decoding device, said encoding device performing time domain aliasing cancellation encoding for transforming an m-th signal frame $x_m(n)$ in the time domain into an m-th signal frame $X_m(k)$ in the frequency domain, said decoding device performing time domain aliasing cancellation decoding for transforming said input frequency-domain signal frame $X_m(k)$ back to a time-domain signal frame x (n), said time-domain signal frames $x_m(n)$ and $x'_m(n)$ and said frequency-domain signal frame $X_m(k)$ having N terms wherein N is a positive integer number and n, k, and m are integers, said encoding device of the time-domain aliasing cancellation apparatus comprising:

a modified analysis window function unit for multiplying term by term the input time-domain signal frame $x_m(n)$ with a modified analysis window function $w_E(n)$ for generating a first time sequence s(n) expressed as $s(n)=x_m(n)w_E(N-1-n)$ with $$w_E(n) = (-1)^J h(n)\sin\frac{(2J+1)\pi}{2N}$$

wherein h(n) is the original analysis window function of a coding system 0<=J<=N/2−1;

an encoding unit, rearranging said first time sequence s(n) for generating a second time sequence y(n) with length N, the first N/4 terms of said second time sequence y(n) being composed of the last N/4 terms of said first time sequence s(n), and the last 3N/4 terms of y(n) being composed of the first 3N/4 terms of s(n);

a subtraction unit, subtracting from the N/2 terms of said second time sequence y(n) the terms in the second half of said time sequence in reversed order for generating a third time sequence v(n);

a first buffer register with N/2 random access memory registers for storing said third time sequence signal v(n);

a first address unit, using a first parameter as the address to select said third time sequence v(n) from said first buffer, rearranging said third time sequence v(n) for generating a fourth time sequence v'(n);

a first sign adjustment unit, using a second parameter for adjusting the sign of each term of said fourth time sequence v'(n);

a first digital filter for transforming said sign-adjusted fourth time sequence v'(n) into a first encoded frequency sequence Y(k), said first encoded frequency sequence Y(k) being the discrete cosine transformation of said fourth time sequence v'(n); and an output unit, using said first frequency sequence Y(k) for generating said output encoded frequency $X_m(k)$, wherein the first N/2 terms of $X_m(k)$ are Y(k) multiplied by a phase factor $(-1)^{mk}$ expressed as $X_m(k)=(-1)^{mk}Y(k)$, and the last N/2 terms of $X_m(k)$ being Y(k) multiplied by a phase factor $(-1)^{mk+1}$ expressed as $X_m(k)=(-1)^{mk+1}Y(k)$, said decoding apparatus comprising an input sign adjusting unit, using said input frequency sequence $X_m(k)$ with length N by a phase factor $(-1)^{mk}$, and shifting the result to the left by 1 bit to perform a multiplication by 2 for generating a second frequency sequence 2Y(k) expressed as $2Y(k)=2(-1)^{mk}X_m(k)$;

a second buffer with N/2 random access memory registers for storing said second frequency sequence 2Y(k);

a second address unit, using said first parameter as the address to select each term of said second frequency sequence 2Y(k) from said second buffer, rearranging for generating a third frequency sequence Y'(k);

a second sign adjustment unit, using said second parameter for correcting the sign of each term of said third frequency sequence Y'(k);

a second digital filter, transforming said sign-adjusted third frequency sequence Y'(k) into a fifth time sequence y(n), said fifth time sequence y(n) being the inverse discrete cosine transformation of said third frequency sequence Y'(k);

a reordering encoder, rearranging said fifth time sequence y(n) for generating a sixth time sequence $q_m(n)$ with length N, the first 3N/4 terms of said sixth time sequence $q_m(n)$ being composed of the last 3N/4 terms of said fifth time sequence y(n), and the last N/4 terms of said sixth time sequence $q_m(n)$ being composed of the negative of the first N/4 terms of said fifth time sequence y(n); and a modified synthesis window function unit for multiplying said fifth time sequence $q_m(n)$ and the previous input time sequence $q_{m-1}(n)$ by a modified synthesis window function $w_D(n)$ for generating the output time sequence $x'_m(n)$ expressed as $$x'_m(n) = w_D\left(n + \frac{N}{2}\right) q_{m-1}\left(n + \frac{N}{2}\right) + w_D(n) q_m(n)$$

wherein $$w_D(n) = (-1)^J f(n) \sin\frac{(2J+1)\pi}{2N},$$

and f(n) is an original synthesis window function.

5. The time domain aliasing cancellation apparatus according to claim 4, wherein each of said first and second digital filters receives an input signal for generating an output signal, and each digital filter includes:

a first adder, adding said received input signal and a fifth internal signal for generating a first internal signal;

a first delay unit, receiving said first internal signal and inserting a time delay for generating a second internal signal;

a second delay unit, receiving said second internal signal and inserting a time delay for generating a third internal signal;

a constant coefficient multiplier, receiving said second internal signal and multiply with a constant coefficient for generating a fourth internal signal;

a second adder, adding said third internal signal and said fourth internal signal together for generating said fifth internal signal; and a third adder, adding said first internal signal and said second internal signal for generating said output signal.

6. A time domain aliasing cancellation signal processing method comprising an encoding method and a decoding method, said encoding method performing time domain aliasing cancellation encoding for transforming an m-th sequence $x_m(n)$ in the time domain into an m-th sequence $X_m(k)$ in the frequency domain, said decoding method performing time domain aliasing cancellation decoding for transforming said input frequency-domain sequence $X_m(k)$ back to an output sequence $x'_m(n)$, said time-domain sequences $x_m(n)$ and $x_m'(n)$ and said frequency-domain sequence $X_m(k)$ having N terms wherein N is a positive integer number, and n, k, and m are integers, said encoding method of the time domain aliasing cancellation method comprising the steps of:

multiplying a modified analysis window function $w_E(n)$ term by term with said input time domain signal frame $x_m(n)$ for generating a first time sequence s(n) expressed as $s(n)=x_m(n)w_E(N-1-n)$ with $$w_E(n) = (-1)^J h(n) \sin\frac{(2J+1)\pi}{2N}$$

wherein h(n) being an original analysis window function, $0<=J<=N/2-1$;

rearranging said first time sequence s(n) for generating a second time sequence y(n) with length N, the first N/4 terms of said second time sequence y(n) being composed of the last N/4 terms of said first time sequence s(n), and the last 3N/4 terms of y(n) being composed of the first 3N/4 terms of s(n);

subtracting from the first N/2 terms of said second time sequence y(n) the terms in the second half of said time sequence in reversed order for generating a third time sequence v(n);

storing said third time sequence signal v(n) in a first buffer with N/2 registers;

using a first parameter as the address to select said third time sequence v(n) from said first buffer, rearranging said third time sequence v(n) for generating a fourth time sequence v'(n);

using a second parameter for adjusting the sign of each term of said fourth time sequence v'(n);

filtering and transforming said sign-adjusted fourth time sequence v'(n) into a first encoded frequency sequence Y(k), said first encoded frequency sequence Y(k) being the discrete cosine transformation of said fourth time sequence v'(n); and reordering said first frequency sequence Y(k) for generating said output encoded frequency $X_m(k)$, wherein the first N/2 terms of $X_m(k)$ being Y(k) multiplied by a phase factor $(-1)^{mk}$ expressed as $$X_m(k)=(-1)^{mk}Y(k)$$

wherein the last N/2 terms of $X_m(k)$ being Y(k) multiplied by a phase factor $(-1)^{mk+1}$ expressed as $$X_m(k)=(-1)^{mk+1}Y(k),$$

said decoding procedure comprising the steps of multiplying said input frequency sequence $X_m(k)$ with length N by a phase factor $(-1)^{mk}$, and shifting the result to the left by 1 bit to perform a multiplication by 2 for generating a second frequency sequence 2Y(k) expressed as $2Y(k)=2(-1)^{mk}X_m(k)$;

storing said 2nd frequency sequence 2Y(k) in a second buffer with N/2 RAM registers;

using said first parameter as the address to select each term of said second frequency sequence 2Y(k) from said second buffer registers and rearrange order thereof for generating a third frequency sequence Y'(k);

using said second parameter for correcting the sign of each term of said third frequency sequence Y'(k);

filtering and transforming said sign-adjusted third frequency sequence Y'(k) into a fifth time sequence y(n), said fifth time sequence y(n) being the inverse discrete cosine transformation of said third frequency sequence Y'(k);

rearranging said fifth time sequence y(n) for generating a sixth time sequence $q_m(n)$ with length N, the first 3N/4 terms of said sixth time sequence $q_m(n)$ being composed of the last 3N/4 terms of said fifth time sequence y(n), and the last N/4 terms of said sixth time sequence $q_m(n)$ being composed of the negative of the first N/4 terms of said 5th time sequence y(n);

multiplying said fifth time sequence $q_m(n)$ and the previous input time sequence $q_{m-1}(n)$ by a modified synthesis window function $W_D(n)$ for generating the output time sequence $x_m'(n)$ expressed as $$x'_m(n) = w_D\left(n + \frac{N}{2}\right) q_{m-1}\left(n + \frac{N}{2}\right) + w_D(n) q_m(n),$$

wherein $$w_D(n) = (-1)^J f(n) \sin\frac{(2J+1)\pi}{2N},$$

and f(n) is an original synthesis window function.

7. The signal processing method according to claim 6, wherein each of the filtering steps further comprises the steps of:

receiving said input signal, adding it to a fifth internal signal for generating a first internal signal;

receiving said first internal signal and inserting a time delay for generating a second internal signal;

receiving said second internal signal and inserting a time delay for generating a third internal signal;

receiving said second internal signal and multiplying with a constant coefficient for generating a fourth internal signal;

receiving said third and fourth internal signals, add these two signals together for generating said fifth internal signal; and receiving said first and second internal signal, add these two signals together for generating said output signal.

8. The signal processing method according to claim 6, further comprising a procedure for generating said first parameter, comprising the steps of:

letting $\tilde{n}$ denote said first parameter, wherein $\tilde{n}$ satisfies the condition expressed as $$(2k+1)\tilde{n}|_{mod\ N}=(2J+1)\ n+J-k\ |_{mod\ N}$$

wherein J is the selected index corresponding to said constant multiplicative coefficient (2K+1) associated with said first parameter;

storing the value of the left-hand-side and the right-hand-side of the above equation in a left accumulator and right a accumulator respectively;

fixing the value of n in said right accumulator while maintaining the value of said right accumulator positive;

incrementing $\tilde{n}$ from zero, until the value of the content of said right accumulator equals the value of the content of said left accumulator; if said intermediate solution $\tilde{n}$ being less than or equal to N/2−1, then said first parameter is equal to $\tilde{n}$; and if said intermediate solution $\tilde{n}$ is greater than N/2−1, then said first parameter is set to $N-1-\tilde{n}$.

9. The signal processing method according to claim 8, further comprising a procedure for generating said second parameter, comprising the steps of:

using a left counter and a right counter to register the carry bits of said left accumulator and said right accumulator, respectively; and if said intermediate solution $\tilde{n}$ is less than or equal to N/2−1, then said second parameter is the result of the XOR of the contents of said left counter and said right counter; and if said intermediate solution $\tilde{n}$ is greater than N/2−1, then said second parameter is the result of the $\overline{XOR}$ of the contents of said right counter and said left counter.

* * * * *